US009716433B2

(12) United States Patent
Coleman et al.

(10) Patent No.: US 9,716,433 B2
(45) Date of Patent: Jul. 25, 2017

(54) CONTROL OF CONVERSION RATIOS OF A POWER SOURCE BLOCK AND A BIDIRECTIONAL ACTIVE FILTER

(71) Applicant: R2 Semiconductor, Inc., Sunnyvale, CA (US)

(72) Inventors: Edward Paul Coleman, Salt Springs, FL (US); Eric Bernard Rodal, Gardnerville, NV (US); Jonathan Audy, Monte Sereno, CA (US); David Fisher, Menlo Park, CA (US)

(73) Assignee: R2 Semiconductor, Inc., Sunnyvale, CA (US)

( * ) Notice: Subject to any disclaimer, the term of this patent is extended or adjusted under 35 U.S.C. 154(b) by 2 days.

(21) Appl. No.: 14/941,552

(22) Filed: Nov. 14, 2015

(65) Prior Publication Data
US 2016/0211750 A1 Jul. 21, 2016

Related U.S. Application Data

(60) Provisional application No. 62/103,776, filed on Jan. 15, 2015.

(51) Int. Cl.
*H02M 3/158* (2006.01)
*H02M 1/15* (2006.01)
(Continued)

(52) U.S. Cl.
CPC ............. *H02M 3/158* (2013.01); *H02J 1/10* (2013.01); *H02M 1/15* (2013.01); *H02M 3/1584* (2013.01); *H02M 2001/0009* (2013.01)

(58) Field of Classification Search
CPC ...... H02M 3/158; H02M 1/15; H02M 3/1584; H02M 2001/0009; H02M 1/12; H02M 1/32; H02M 7/49
See application file for complete search history.

(56) References Cited

U.S. PATENT DOCUMENTS 4,654,769 A * 3/1987 Middlebrook ........ H02M 3/158
363/16
5,394,075 A 2/1995 Ahrens et al.
(Continued)

OTHER PUBLICATIONS

PCT; Notification of Transmittal of the International Search Report and the Written Opinion of the International Searching Authority, or the Declaration; PCT/US 16/12894; Date of Mailing Mar. 28, 2016; International Filing date Jan. 11, 2016; PCT/US2016/012894.
(Continued)

*Primary Examiner* — Jue Zhang
*Assistant Examiner* — Lakaisha Jackson
(74) *Attorney, Agent, or Firm* — Brian R. Short

(57) ABSTRACT

Methods, systems and apparatuses for voltage regulation are disclosed. For an embodiment, a voltage regulator includes a power source block configured to convert an input voltage to an output voltage to supply current to an output load, a storage capacitor, and an active filter configured to transfer energy between the output load and the storage capacitor. A conversion ratio of the active filter is controlled by a parameter related to the output voltage, and a conversion ratio of the power source block is at least partially controlled by a parameter related to the voltage on the storage capacitor.

18 Claims, 17 Drawing Sheets

(51) Int. Cl.
*H02J 1/10* (2006.01)
*H02M 1/00* (2006.01)

(56) References Cited

U.S. PATENT DOCUMENTS

| | | | |
|---|---|---|---|
| 6,370,046 B1* | 4/2002 | Nebrigic | H02M 3/07 327/536 |
| 6,424,207 B1 | 7/2002 | Johnson | |
| 7,019,503 B1 | 3/2006 | Ortiz et al. | |
| 7,085,145 B2 | 8/2006 | Sheehy et al. | |
| 7,899,415 B1 | 3/2011 | Schoneman et al. | |
| 7,944,273 B1 | 5/2011 | Vinciarelli et al. | |
| 8,243,410 B2 | 8/2012 | Ayyanar et al. | |
| 8,482,947 B2 | 7/2013 | Chapman et al. | |
| 8,570,774 B2 | 10/2013 | Wang et al. | |
| 8,633,766 B2 | 1/2014 | Khlat et al. | |
| 8,723,490 B2 | 5/2014 | Moussaoui et al. | |
| 8,742,734 B2 | 6/2014 | Martin et al. | |
| 8,803,605 B2 | 8/2014 | Fowers et al. | |
| 8,810,215 B2 | 8/2014 | Horman et al. | |
| 2007/0236192 A1* | 10/2007 | Vo | H02M 3/157 323/282 |
| 2008/0157732 A1* | 7/2008 | Williams | H02M 3/07 323/266 |
| 2011/0156668 A1* | 6/2011 | Bergveld | H02M 3/07 323/266 |
| 2014/0232366 A1* | 8/2014 | Lawson | H02J 3/32 323/282 |

OTHER PUBLICATIONS

Abu-Qahouq, Abu-Qahouq "Analysis and Design of N-Phase Current-Sharing Autotuning Controller", IEEE Trans Pwr Elect 25 p. 1641 (2010).

Barrado et. al., "The Fast Response Doiuble Buck DC-DC Converter (FRDB): Operation and Output Filter Influence", IEEE Trans Pwr Elect 20 p. 1261 (2005).

Chen et. al., "DC/DC Conversion Systems Consisting of Multiple Converter Modules: Stability, Control, and Experimental Verifications", IEEE Trans Pwr Elect 24 p. 1463 (2009).

Della Monica et. al., "Predictive Digital Control for Voltage Regulation Module Applications", IEEE PEDS 2005 p. 32.

Dhople et. al., "Time-Optimal Control in Dc-Dc Converters: A Maximum Principle Perspective", APEC 2015 p. 2804.

Farhadi et. al., "Performance Enhancement of Actively Controlled Hybrid DC Microgrid Incorporating Pulsed Load", IEEE Trans Ind Appl 51 p. 3570 (2015).

Giral et. al., "Interleaved Converters Operation Based on CMC", IEEE Trans Pwr Elect 14 p. 643 (1999).

Hamza et. al., "Conducted EMI Noise Mitigation in DC-DC Converters using Active Filtering Method", Power Elect Spec Conf 2008 p. 188.

Hur et. al., "A Robust Load-Sharing Control Scheme for Parallel-Connected Multisystems", IEEE Tr Ind Elect 47 p. 871 (2000).

Jia et. al., "A Practical Control Strategy to Improve Unloading Transient Response Performance for Buck Converters", Energy Conversion Congress and Exhibition 2011 p. 397.

Jia et. al., "Predictable Auxiliary Switching Strategy to Improve Unloading Transient Response Performance for DC-DC Buck Converter", IEEE Trans Ind Appl 49 p. 931 (2013).

Jia et. al., "A Simplified Charge Balance Control for Better Unloading Response", 2012 IEEE Int'l Symposium on Industrial Elect p. 111.

Kapat et. al., "Near-Null Response to Large-Signal Transients in an Augmented Buck Converter: A Geometric Approach", IEEE Trans Pwr Elect 27 p. 3319 (2012).

Lambert et. al., "Fast Load Transient Regulation of Low-Voltage Converters with the Low-Voltage Transient Processor", IEEE Trans Pwr Elect 24 p. 1839 (2009).

Mazumder et. al., "Wireless PWM Control of a Parallel DC-DC Buck Converter", IEEE Trans Pwr Elect 20 p. 1280 (2005).

Shi et. al., "Automatic Current Sharing of an Input-Parallel Output-Parallel (IPOP)-Connected DC-DC Converter System with Chain-Connected Rectifiers", IEEE Trans Pwr Elect 30 p. 2997 (2015).

Wang et. al., "Mixed-Signal-Controlled Flyback-Transformer-Based Buck Converter with Improved Dynamic Performance and Transient Energy Recycling", IEEE Trans Pwr Elect 28 p. 970 (2013).

Xiao et. al., "A Novel Control Approach to the DC Active Power Filter Used in a Low Ripple and Large Stable/Pulse Power Supply", Power Elect Spec Conf 2003 p. 1489.

Yao et. al., "Adaptive Voltage Position Design for Voltage Regulators", APEC 2004 p. 272.

* cited by examiner

CONTROL OF CONVERSION RATIOS OF A POWER SOURCE BLOCK AND A BIDIRECTIONAL ACTIVE FILTER

RELATED PATENT APPLICATIONS

This patent application claims the benefit of U.S. Provisional Patent Application Ser. No. 62/103,776, filed Jan. 15, 2015, which is herein incorporated by reference.

FIELD OF THE DESCRIBED EMBODIMENTS

The described embodiments relate generally to power conversion, and more specifically to the combined control of a DC-DC converter and active filter used in conjunction to provide low-ripple, fast-responding power delivery to a time-varying load.

BACKGROUND

The combination of a bidirectional converter with storage capacitor, acting as an active filter, with a conventional multiphase converter, acting as a power source, is described in Ayyanar et. al. U.S. Pat. No. 8,243,410 and Lambert et. al. Lambert et. al. describe control of the bidirectional converter (active filter) as being primarily that of a voltage-controlled current source or sink, with the voltage control based on the output voltage. The active filter then becomes a shunt capacitor as seen from the main converter (power source). The design of the main converter control system is then performed in a conventional fashion, accounting for the additional effective capacitance of the active filter in the specification of the compensation network for the power source. A second loop is provided within the control of the active filter to regulate the voltage on the auxiliary (storage) capacitor. This second loop is apparently slow compared to the main current control, as suggested by e.g. FIG. 3 of Lambert et. al. This second loop is also optionally adjusted to support load-line control (voltage positioning) of the auxiliary capacitor, using the primary converter (power source) current as an input to adapt the target voltage for the auxiliary capacitor (Lambert et. al. equation (34)).

This control approach simplifies the design of the overall controller, since the control system for the active filter is not dependent on the state of the power source, and the power source only sees the active filter as a change in load. Thus the two converters may be controlled by independent compensators, using conventional single-input-single-output (SISO) design techniques. However, it is well-known that dynamic voltage scaling (DVS), in which the supply voltage to a digital circuit or portion thereof is changed depending on the instantaneous requirements of the digital circuit, is useful for optimizing performance and power consumption of digital systems. The control approach described by Lambert et. al. provides good response to load current transients, but an intentional change in output voltage must be managed by the power source converter. As noted by Lambert et. al., the primary (power source) converter is designed for efficiency at DC and low frequencies, and thus uses slow switching frequency and large inductances. It is not optimized for rapid changes in output voltage. Further, if the output voltage is to be changed, the low-voltage transient processor (active filter) must be made inactive, or its control configuration must be changed, to prevent it from drawing large currents and over-charging or depleting the storage capacitor, and slowing the change in output voltage driven by the primary converter.

There is a need for a more robust control approach for the coupled power source/active filter that allows fast DVS, while ensuring that the active filter operating constraints are satisfied, and providing good stability and response to load current transients, including rapidly repeated load current transients.

SUMMARY

An embodiment includes a voltage regulator. The voltage regulator includes a power source block configured to convert an input voltage to an output voltage to supply current to an output load, a storage capacitor, and an active filter configured to transfer energy between the output load and the storage capacitor. A conversion ratio of the active filter is controlled by a parameter related to the output voltage, and a conversion ratio of the power source block is at least partially controlled by a parameter related to the voltage on the storage capacitor.

Another embodiment includes a method of voltage regulation. The method includes converting, by a power source block, an input voltage to an output voltage to supply current to an output load, transferring, by an active filter, energy between the output load and a storage capacitor, controlling a conversion ratio of the active filter with a parameter related to the output voltage, and at least partially controlling a conversion ratio of the power source block with a parameter related to the voltage on the storage capacitor.

Other aspects and advantages of the described embodiments will become apparent from the following detailed description, taken in conjunction with the accompanying drawings, illustrating by way of example the principles of the described embodiments.

DETAILED DESCRIPTION

At least some of the disclosed embodiments include a DC-DC converter acting as a power source, converting power from a voltage supply, and a bidirectional converter acting as an active filter, transferring power between an output node and a storage capacitor, wherein the power source, the active filter, and the load share a common output node and output capacitance, and wherein the control input to the power source is an active filter storage capacitor voltage. For at least some embodiments, the output voltage is used to control the active filter, and does not directly influence the operation of the power source. For an embodiment, the active filter is implemented as a low-voltage transient processor.

For an embodiment, the control input to the power source is a linear combination of the active filter storage capacitor voltage and the average current supplied by a power source inductor, for a single phase power source. For an embodiment, the power source comprises multiple phases, each with a separate inductor, and the control input to the power source is a linear combination of the active filter storage capacitor voltage and the average current of some or all of the inductors. For an embodiment, the control input to the power source is a linear combination of the active filter storage capacitor voltage and the current delivered to the load. For an embodiment, the control input to the power source is the active filter storage capacitor voltage, and the target value for the active filter storage capacitor voltage comprises a term proportional to the average current through the power source inductor or inductors. For an embodiment, the magnitude of the signal proportional to the inductor current is selected to allow the storage capacitor voltage to achieve a stable reduced value during a transient increase in load current, and return to the original storage capacitor voltage when the load current returns to its original value.

For an embodiment, control can be switched between a first mode, in which the active filter controls the output voltage and the power source controls the active filter storage capacitor voltage, and a conventional (or second) mode, in which the active filter is turned off and the power source controls the output voltage.

Figure 1A:
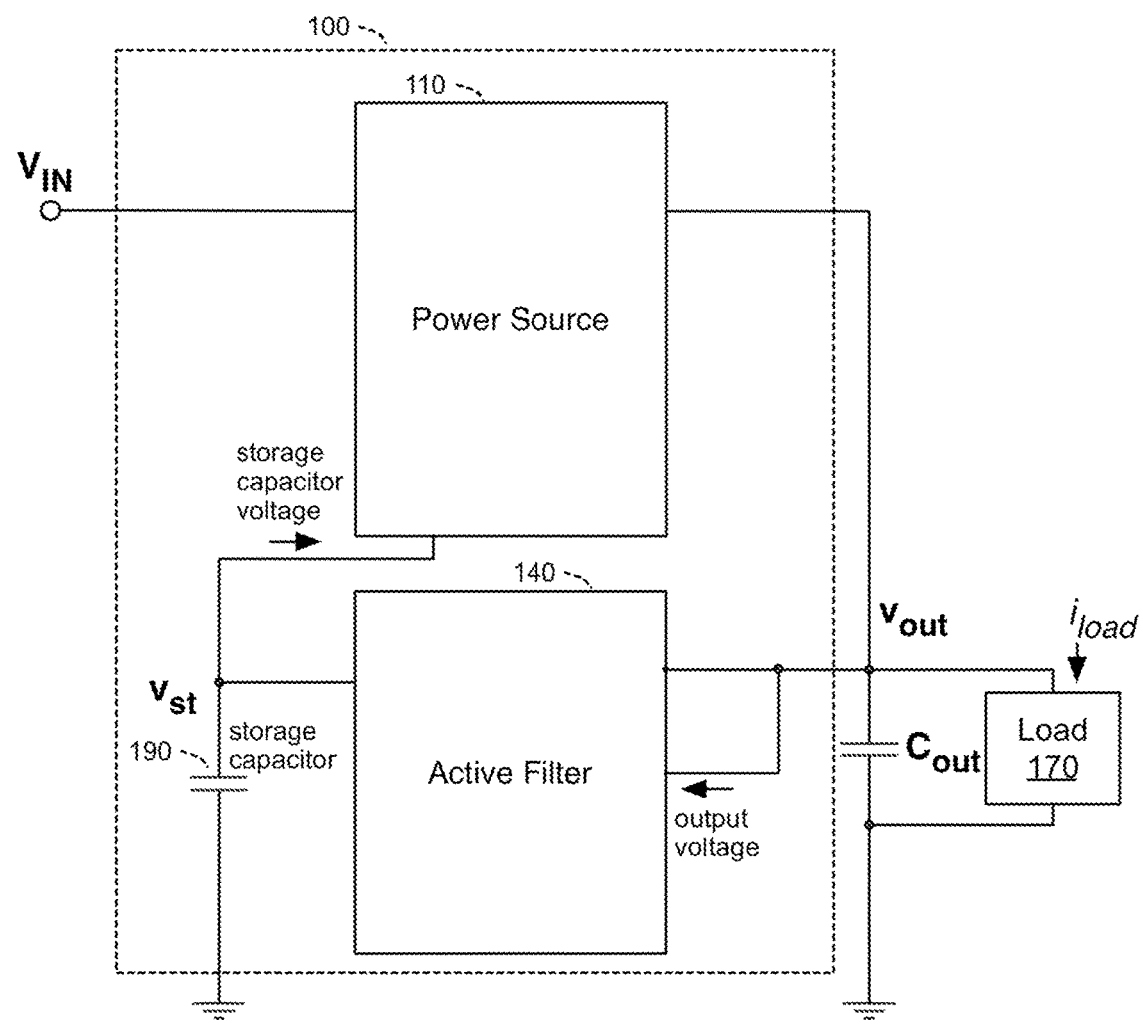
FIG. 1A shows a voltage regulator that includes a power source block and an active filter, according to an embodiment.

FIG. 1A shows a voltage regulator that includes a power source block and an active filter, according to an embodiment. As shown, the voltage regulator 100 includes a power source block 110 configured to convert an input voltage ($V_{IN}$) to an output voltage ($V_{out}$) to supply current to an output load 170. The voltage regulator 100 further includes a storage capacitor 190. The voltage regulator 100 further includes an active filter 140 configured to transfer energy between the output load 170 and the storage capacitor 190. For an embodiment, the active filter is implemented as a low-voltage transient processor. For at least some embodiments, a conversion ratio of the active filter 140 is controlled by a parameter related to the output voltage ($V_{out}$). For at least some embodiments, a conversion ratio of the power source block 110 is at least partially controlled by a parameter related to a voltage ($V_{st}$) on the storage capacitor. In contradistinction to a conventional control configuration, for at least some embodiments, the conversion ratio of power source block 110 is not based on the output voltage or the difference between the output voltage and a target value.

Figure 1B:
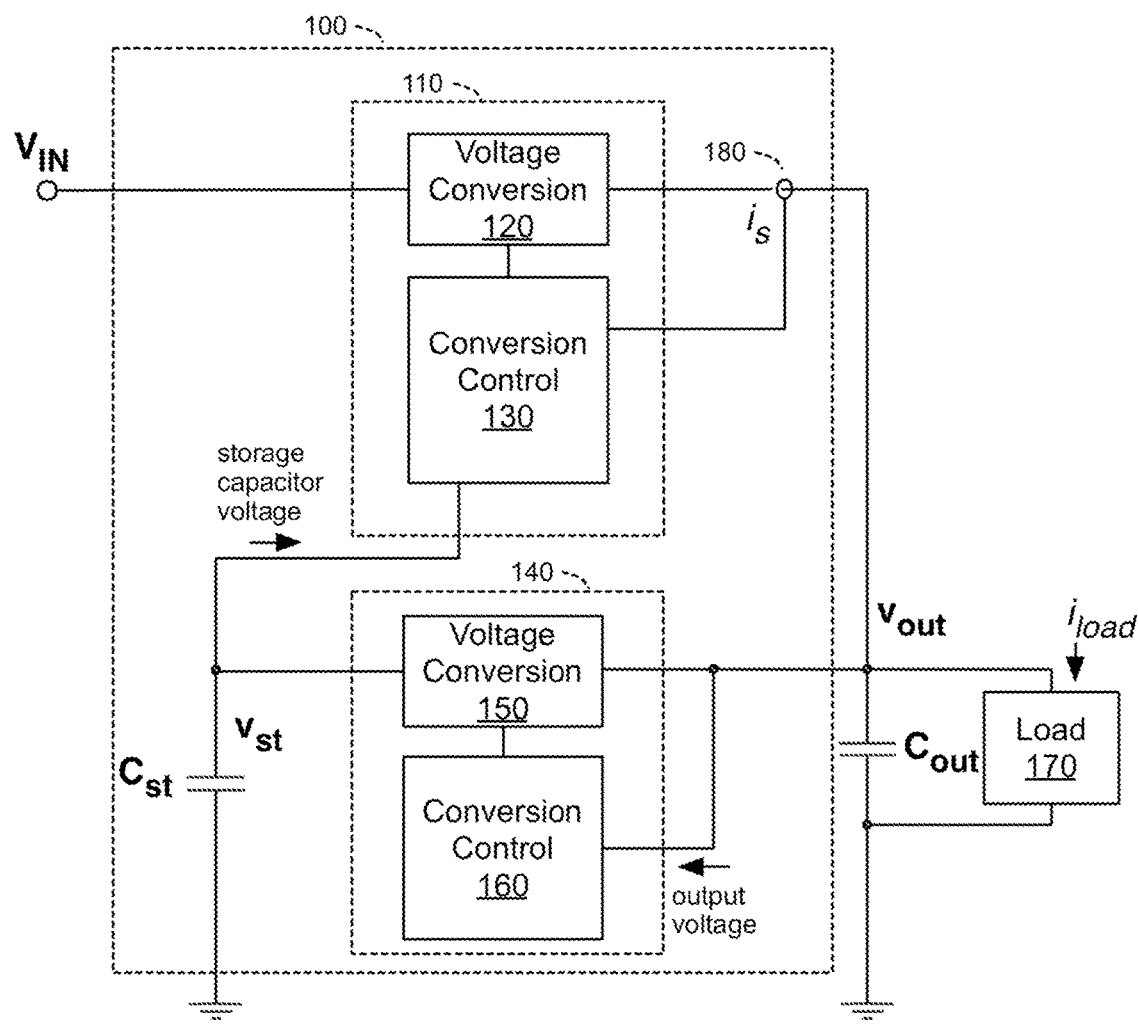
FIG. 1B shows a voltage regulator that includes a power source block and an active filter, according to another embodiment.

FIG. 1B shows a voltage regulator that includes a power source block and an active filter, according to another embodiment. For this embodiment, power source block 110 further includes a voltage conversion unit 120 and a conversion control unit 130. Similarly, for this embodiment, the active filter 140 includes a voltage conversion unit 150 and a conversion control unit 160. The voltage conversion unit 120 may be any known switched voltage converter, such as a buck, boost, buck-boost, or flyback converter. The voltage conversion unit 150 may similarly be any known switched voltage configuration, but is limited to those configurations that support bidirectional operation, to allow current flow to and from storage capacitor $C_{st}$.

Conversion control unit 160 may use any conventional single-in single-out (SISO) or multiple-in single-out (MISO) control approach. A voltage sensor is shown (that is, the input to the conversion control unit 160 is a sensed voltage), but current-mode control, or a mixed current-voltage mode, may also be used.

For at least some embodiments, the voltage regulator 100 includes a current sensor 180. For at least some embodiments, the current sensor 180 is operative to sense an output current of the power source block 110. Further, for an embodiment, the conversion ratio of the power source block 110 is additionally controlled by a value of the sensed output current ($i_s$).

For at least some embodiments, the conversion control unit 130 receives as its inputs the storage capacitor voltage $v_{st}$ and the output current $i_s$ of voltage conversion unit 120, estimated by sensor 180. For an embodiment, conversion control unit 130 includes a conventional SISO compensator, using as its input a linear combination of the voltage $v_{st}$ and current $i_s$. For an embodiment, the voltage $v_{st}$ is passed through a Venable type III compensator, but the corresponding voltage from $i_s$ is processed by a type II compensator. In an alternative embodiment, conversion control unit 130 comprises a simple proportional control.

Figure 2:
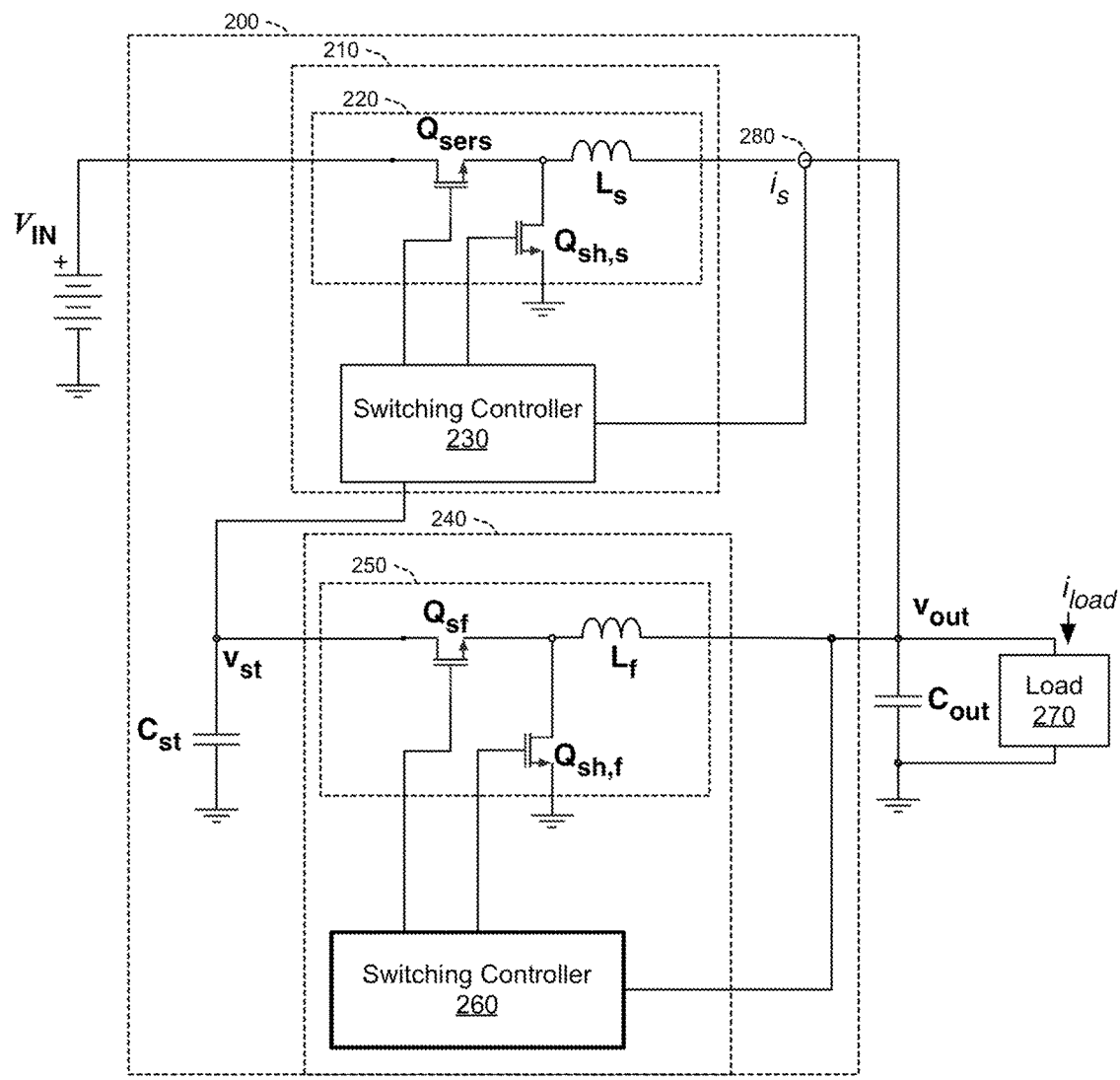
FIG. 2 shows a voltage regulator that includes a power source block, an active filter, and an output current sensor, according to another embodiment.

FIG. 2 shows a voltage regulator that includes a power source block and an active filter in greater detail, according to another embodiment. Converter (voltage regulator) 200 includes a power source 210, including a buck converter 220, and switching controller 230, and active filter 240, including a bidirectional buck converter 250, and switching controller unit 260. For an embodiment, the switching controller unit 260 is a conventional voltage-mode control based on output voltage $v_{out}$ across the load 270.

As shown, for an embodiment, the power source block 210 includes a series switch element ($Q_{sers}$), a shunt switch element ($Q_{sh,s}$), and the switching controller 230. For at least some embodiments, the switching controller 230 is operative to control opening and closing of the series switch element ($Q_{sers}$) and the shunt switch element ($Q_{sh,s}$), wherein the opening and closing of the series switch element ($Q_{sers}$) and the shunt switch element ($Q_{sh,s}$) generates a switching voltage, and wherein filtering the switching voltage with an output inductor ($L_s$) and a load capacitor generates the output voltage ($V_{out}$).

For at least some embodiments, control of the conversion ratio of the power source block 210 includes control of the duty cycle of the opening and closing of the series switch element ($Q_{sers}$) and the shunt switch element ($Q_{sh,s}$), and wherein the duty cycle is controlled by the parameter related to the voltage ($V_{st}$) on the storage capacitor $C_{st}$.

As previously described, for at least some embodiments, the power source block 210 includes a current sensor 280. For an embodiment, the current sensor 280 is operative to sense an output current of the power source block 210. For at least some embodiments, the duty cycle is controlled with a signal proportional to the sensed output current combined with a signal that is proportional to the voltage on the storage capacitor.

Figure 3:
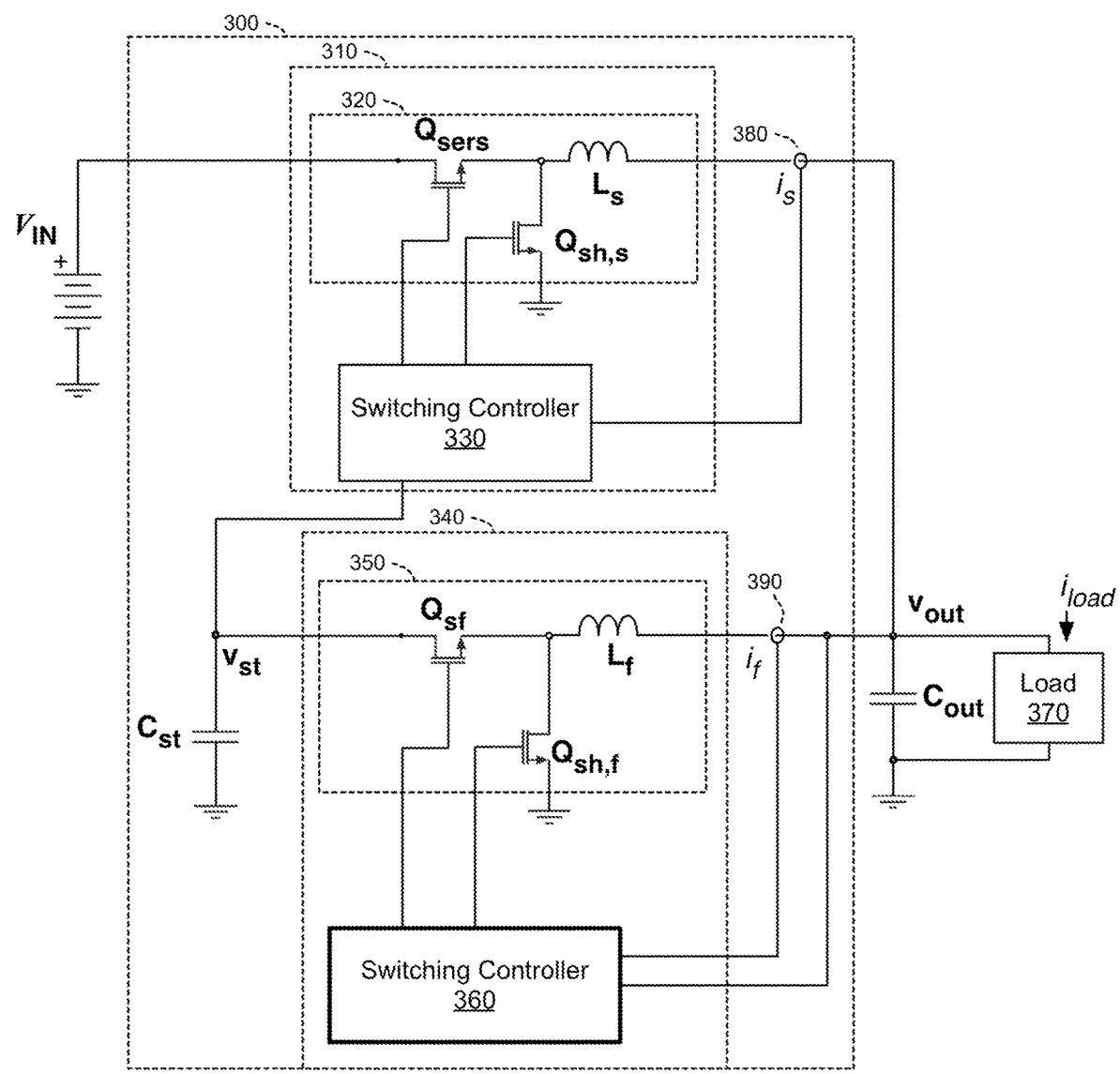
FIG. 3 shows a voltage regulator that includes a power source block, an active filter and an output current sensor, according to another embodiment.

FIG. 3 shows a voltage regulator that includes a power source block, an active filter and an output current sensor, according to another embodiment. Converter (voltage regulator) 300 includes a power source 310, including a buck converter 320, and switching controller 330, and active filter 340, including a bidirectional buck converter 350, and switching controller unit 360. Switching controller unit 360 is a conventional voltage-mode control based on output voltage $v_{out}$ across the load 370. As an alternate embodiment, an input to the switching controller unit 360 includes an estimate of active filter current $i_f$ from sensor 390. Switching controller unit 330 uses as control inputs the storage capacitor voltage $v_{st}$ and power source block output current $i_s$, sensed by sensor 380. NMOS transistor switching elements are shown, but any known switching elements, such as PMOS transistors, bipolar transistors, or insulated-gate bipolar transistors (IBGT) may be used, as appropriate to the application.

Figure 4:
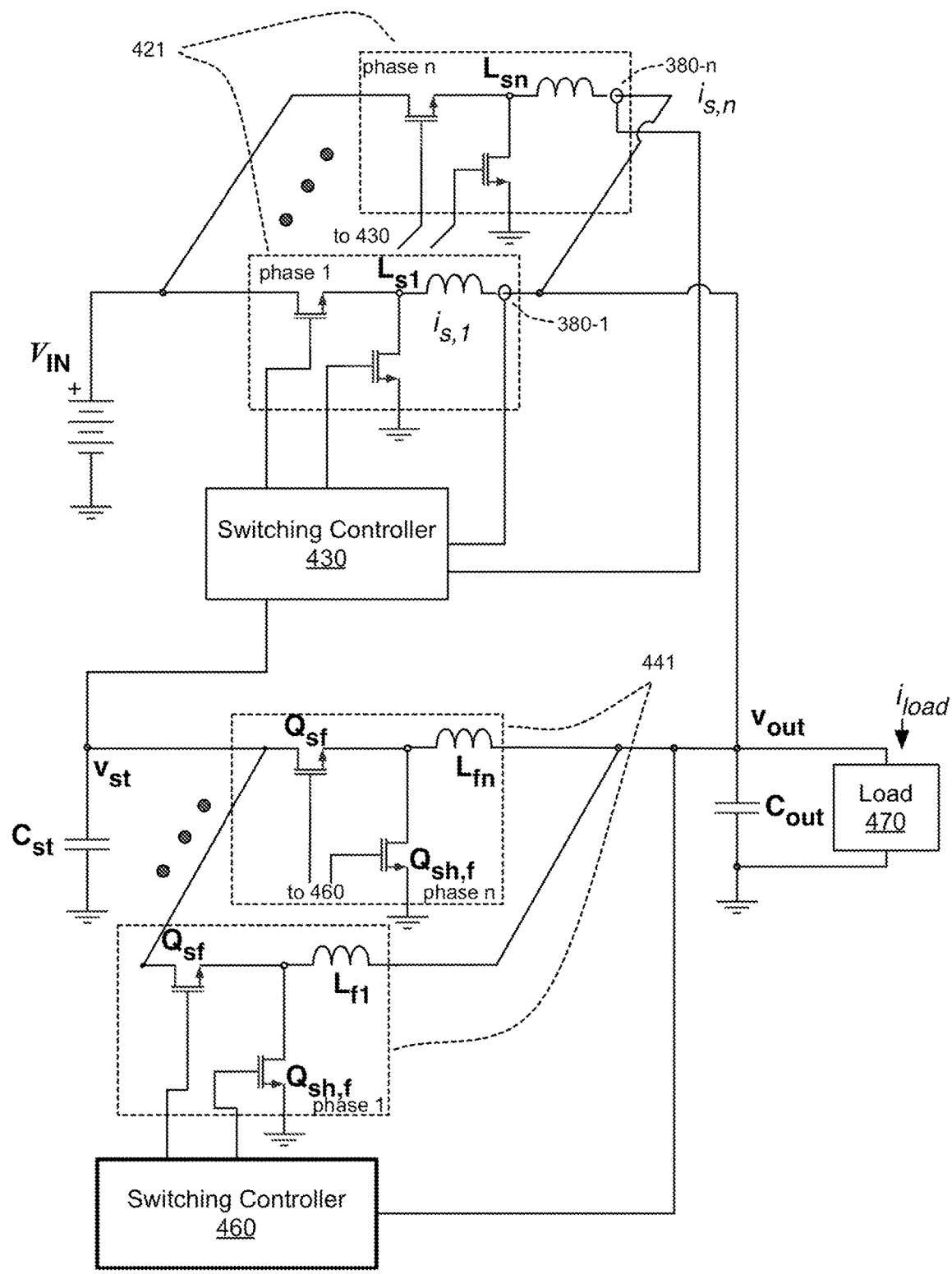
FIG. 4 shows a voltage regulator that includes a multiphase power source block and a multiphase active filter, according to another embodiment.

FIG. 4 shows a voltage regulator that includes a multi-phase power source block and a multiphase active filter, according to another embodiment. For an embodiment, the power source block includes a plurality of phases of switched converters 421, and wherein a phase of each switched converter is offset in time to minimize a variation in a sum of output currents of the plurality of phases of switched converters. The plurality of switched converters 421 drives the load 470.

For this embodiment, either or both of voltage converter 220 and active filter converter 250 may include multiphase converters 421 and 441 (controlled by switching controller unit 430 and switching controller unit 460), where the number of phases n is an integer greater than 1, and in normal operation each phase is offset in time to minimize the variation in the sum of the output currents of all the phases. The choice of number of phases is determined by a tradeoff between size, cost, current ripple, response speed, and overall flexibility, and varies depending on the application envisioned. For an embodiment, the switching controller unit 430 may employ as inputs the estimated current of each individual phase 380-1 through 380-n, or an estimate of the average current through all the phases, in addition to voltage $v_{st}$. For an embodiment, the switching frequency of the active filter may be higher than that of the power source, and correspondingly the inductors $L_{s1} \ldots L_{sn}$ are chosen to be larger than the inductors $L_{f1} \ldots L_{fn}$. For an embodiment, the power source converter switching frequency is about 2.5 MHz for each phase, and the active filter converter switching frequency is about 50 MHz for each phase, with $L_{s1} \ldots L_{sn} \approx 330$ nH and $L_{f1} \ldots L_{fn} \approx 20$ nH.

Figure 5:
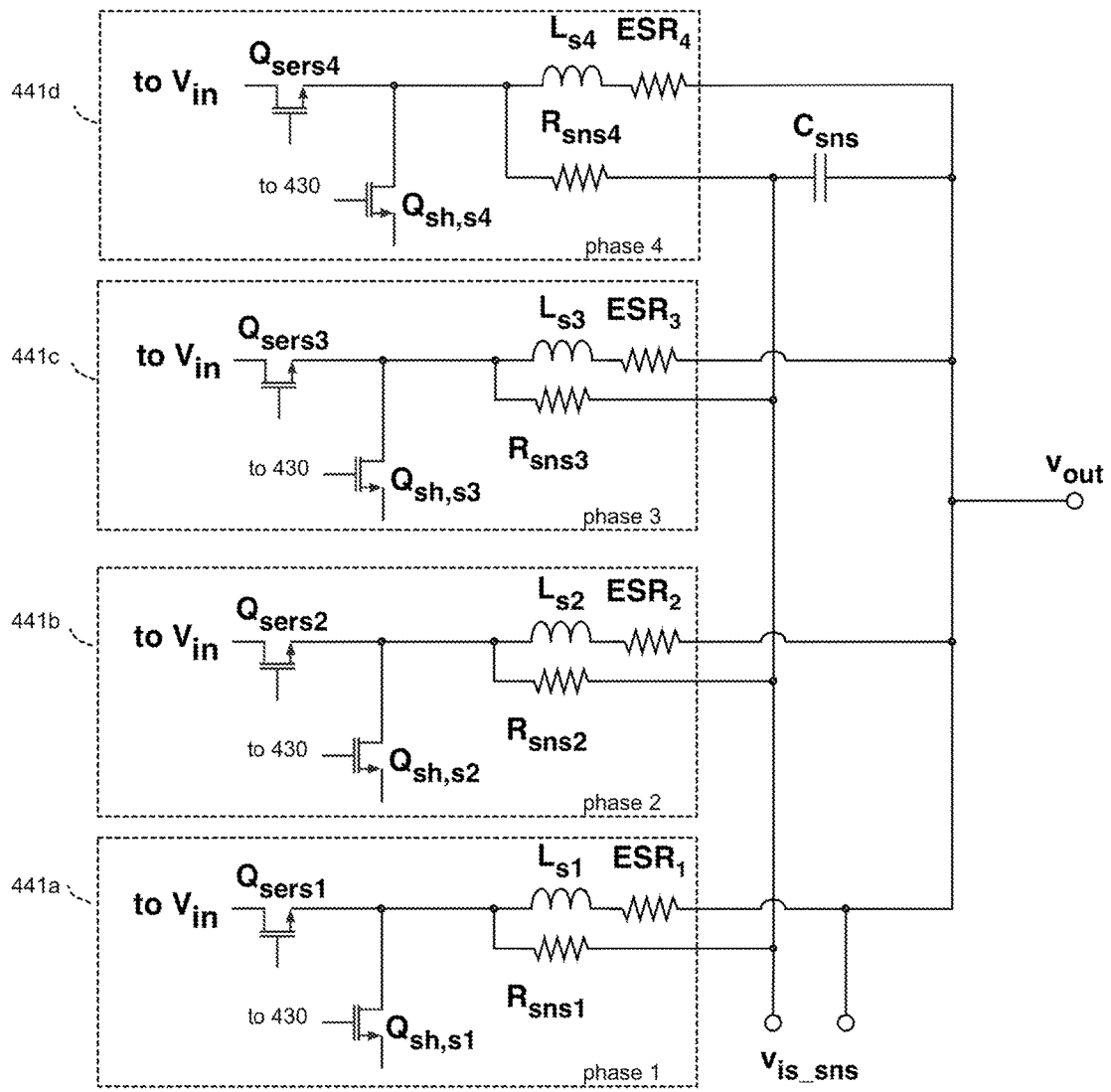
FIG. 5 shows an embodiment of an output current sensor incorporated in a voltage regulator that includes a multiphase power source block depicted in FIG. 4, according to another embodiment.

FIG. 5 shows a voltage regulator that includes a multi-phase power source block depicted in FIG. 4, according to another embodiment. Specifically, FIG. 5 depicts an embodiment of an average current sensor for a four-phase converter. Resistors $R_{sns1}$ through $R_{sns4}$ act as current injectors to charge capacitor $C_{sns}$, connected between the resistors and the output voltage $v_{out}$. Each phase inductor includes a parasitic resistive loss $ESR_1$ through $ESR_4$. For the simple case where the four branches (441a, 441b, 441c, 441d) are nominally identical, $C_{sns}$ is selected so that the time constant of the parallel network $(R_{sns1}/4)$ $C_{sns} = (L_{s1}/ESR_1)$. The voltage across $C_{sns}$ is then proportional to the average current through the four phases. Current may also be sensed by other means, such as simple resistive sensors, or replica (mirror) devices for the series and shunt transistors $Q_{sf}$ and $Q_{sh,f}$ (shown as $Q_{sers1}$-$Q_{sers4}$, $Q_{sh,s1}$-$Q_{sh,s4}$), with appropriate overlay timing.

For an embodiment, the conversion ratio of the power source block is additionally controlled by a value of the sensed output current, such as the output of the current sensor depicted in FIG. 5. For an embodiment, the current source signal may be converted into a current, which is injected directly into the input of the error amplifier of a compensator, with the current converted into a voltage by the compensator impedance network.

For an embodiment, the current sensor is operative to sense an average output current over phases of the plurality of phases of switched converters of the power source block, wherein the conversion ratio of the power source block is additionally controlled by a value of the sensed averaged output current.

Figure 6:
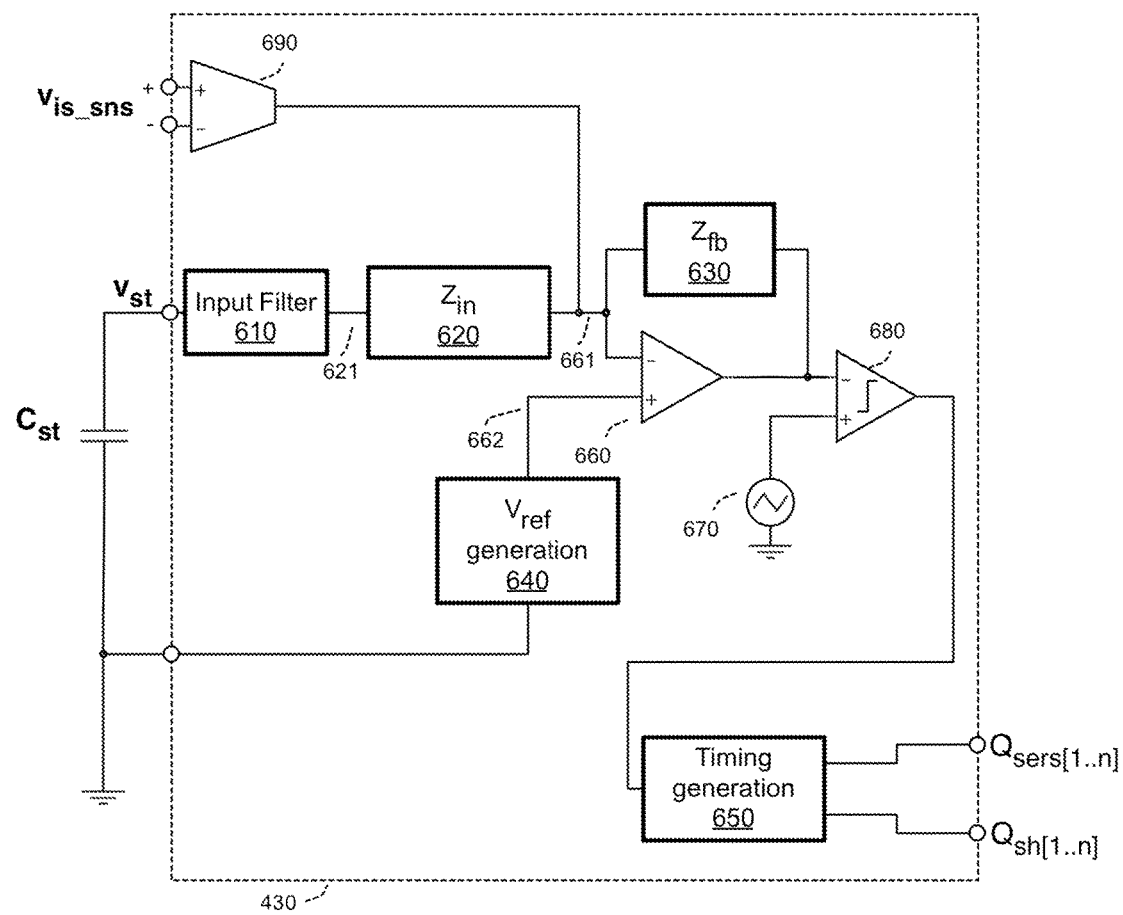
FIG. 6 shows a switching controller, according to an embodiment.

FIG. 6 shows a switching controller, according to an embodiment. For this embodiment, the switching controller includes a power source compensation network that includes an error amplifier, and a signal from the current source is injected directly to an input of the error amplifier.

Specifically, an embodiment of the switching controller 430 is depicted in FIG. 6. The storage capacitor voltage $v_{st}$ is optionally passed through an input filter 610 to remove any undesired high-frequency switching or environmental noise. It is then provided to a conventional compensator composed of impedance $Z_{in}$ (620), impedance $Z_{fb}$ (630), and error amplifier 660. The current sense voltage $V_{is\_sns}$ is converted to a current by a transconductance amplifier 690, and injected directly into the negative input node 661 of differential amplifier (previously referred to as error amplifier) 660. This configuration improves transient response to changes in the power source current if the input impedance $Z_{in}$ comprises one or more resistor-capacitor networks, such that a delay in encountered by a signal entering $Z_{in}$ through node 621. The positive input 662 of error amplifier 660 is provided by $V_{ref}$ generation block 640, which uses the low side of output capacitor $C_{st}$ as its ground reference voltage. In this fashion, any offsets between the capacitor ground and local ground within the controller 430 are corrected. The output of error amplifier 660 is compared by comparator 680 to a triangle wave from triangle wave generator 670, producing a pulse sequence. The pulse sequence is converted into control voltages for the series switches $Q_{sers[1 \ldots n]}$ and shunt switches $Q_{sh[1 \ldots n]}$ by timing generation block 650. Timing generation block 650 provides appropriate offsets in the timing of each phase, and may also impose dead time and non-overlap requirements on the series and shunt controls of each phase, as are known in the art. Note that this control can also be used in a single-phase implementation, as switching controller 330, with appropriate changes in the compensation 610, 620, 630 and timing generation 650.

Figure 14:
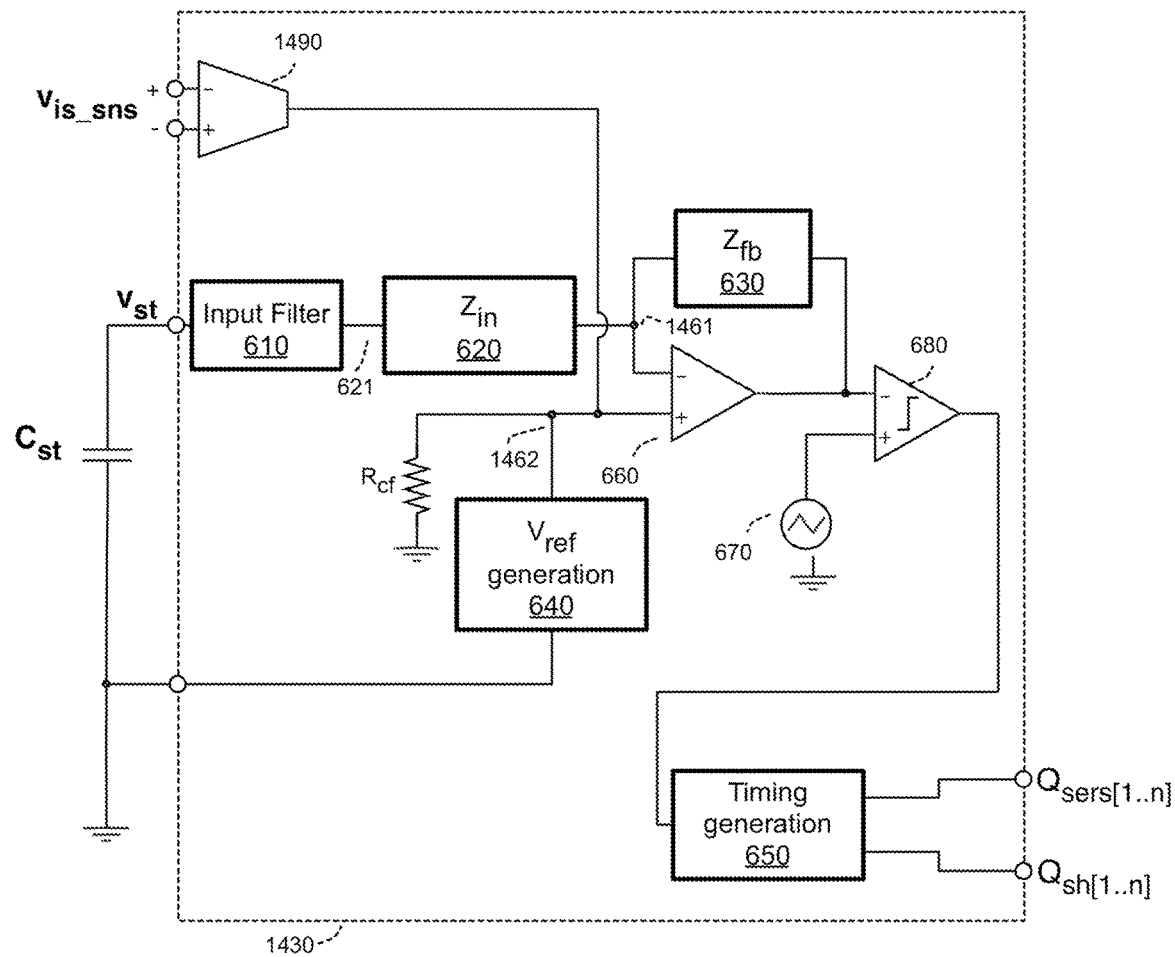
FIG. 14 shows a switching controller, according to another embodiment.

FIG. 14 shows a switching controller, according to another embodiment. Specifically, FIG. 14 shows an alternative embodiment of the switching controller, 1430 that includes a transconductance amplifier with inverted polarity, 1490, is connected to node 1462, with a resistor $R_{ef}$ to convert the sense current to an explicit offset of the target voltage $V_{ref}$. Resistor $R_{ef}$ may optionally be replaced with a compensation network, as long as the design of the reference generation 640 is performed taking the compensation behavior into account.

Figure 7:
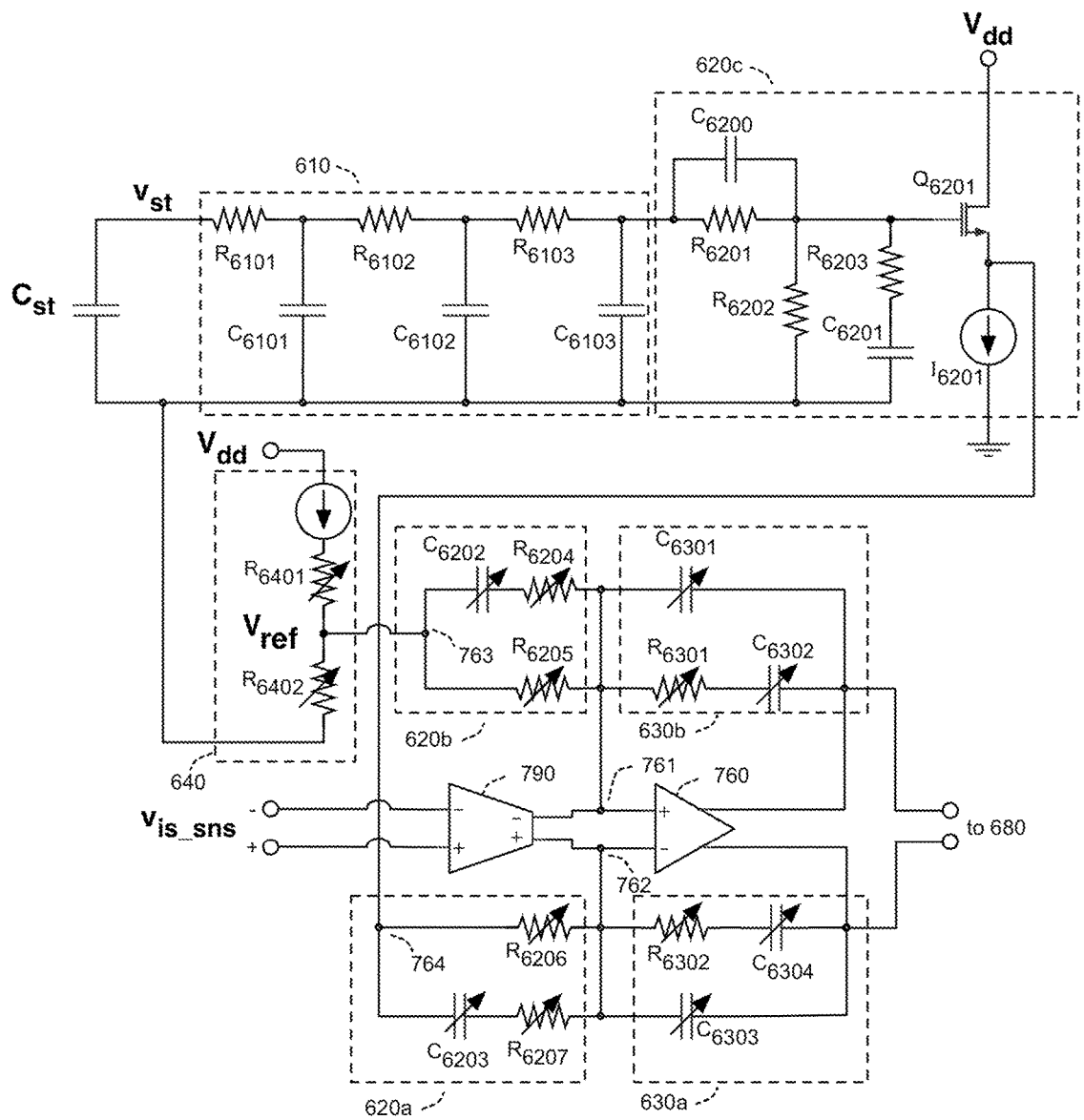
FIG. 7 shows the input filter, the input impedance, the feedback impedance, and the $V_{ref}$ generation block in greater detail, according to an embodiment.

FIG. 7 shows the input filter, the input impedance, the feedback impedance, and the $V_{ref}$ generation block in greater detail, according to an embodiment. Specifically, FIG. 7 shows more detail of an embodiment of blocks 610, 620, 630, 640, and 660. Filter 610 is composed of a cascaded R-C filter. For an embodiment, the time constants of this filter are selected to be less than 1 nanosecond for a triangle wave frequency 670 of 2.5 MHz for low phase delay, and thus act solely to remove high-frequency noise, with minimal effects on overall control operation. Filter 610 may be omitted or modified as appropriate to the expected noise in the application environment. Error amplifier 760 is a fully-differential implementation of error amplifier 660. Compensation input impedance 620 is subdivided into single-ended impedance 620c and differential impedance blocks 620a and 620b. Similarly, feedback impedance 630 is subdivided into differential impedance blocks 630a and 630b. Single-ended impedance 620c comprises a feedforward block composed of capacitor $C_{6200}$ and resistor $R_{6201}$. Resistor $R_{6201}$ and $R_{6202}$ comprise a 2:1 voltage divider at DC. Filter R6203 and C6201 provides a voltage sample (not shown) for other circuit functions. A source follower comprising transistor $Q_{6201}$ and current source $I_{6201}$ provides isolation from blocks 620a and 630a.

Block 620a includes a conventional feedforward impedance corresponding to a Venable type III compensation scheme. Variable capacitor $C_{6203}$ and variable resistors $R_{6206}$ and $R_{6207}$ allow for adaptation of the pole and zero locations of the controller as required by the application. Block 630a comprises a conventional feedback impedance, again employing variable capacitors $C_{6303}$ and $C_{6304}$ and variable resistor $R_{6302}$ to allow for adjustment of frequency-dependent gain of the overall amplifier. Blocks 620b and 630b provide a matched differential compensation path for reference voltage $V_{ref}$. The reference voltage is generated by block 640, comprising a tapped resistor $R_{6401}/R_{6402}$, where the resistor values are varied to change the reference voltage and thus the target storage capacitor voltage. The ground reference voltage of block 640 is the low side of storage capacitor $C_{st}$, to ensure that control is imposed on the voltage across $C_{st}$, independent of any offset between the low side of $C_{st}$ and local ground potential within the control block 430. Voltage $v_{is\_sns}$, obtained here from the average current sensor of FIG. 5, is converted by differential transconductance amplifier 790 to a differential current, which is injected into nodes 761 and 762 of error amplifier 760. These nodes are the differential analog of the single-ended node 661 of FIG. 6. Since the current corresponding to the sensed inductor current is injected after the feedforward impedances 620 (FIG. 6) or 620a and 620b (FIG. 7), the compensator can be regarded as a Venable type II circuit for the current feedback signal, while it is a type III compensator for the storage capacitor voltage signal. In an alternative embodiment, the output of differential transconductance amplifier 790 may be connected to nodes 763 and 764, so that the output current of 790 is converted to an input voltage which adds to the filtered voltage from the storage capacitor $v_{st}$.

Control Design Issues

Figure 11:
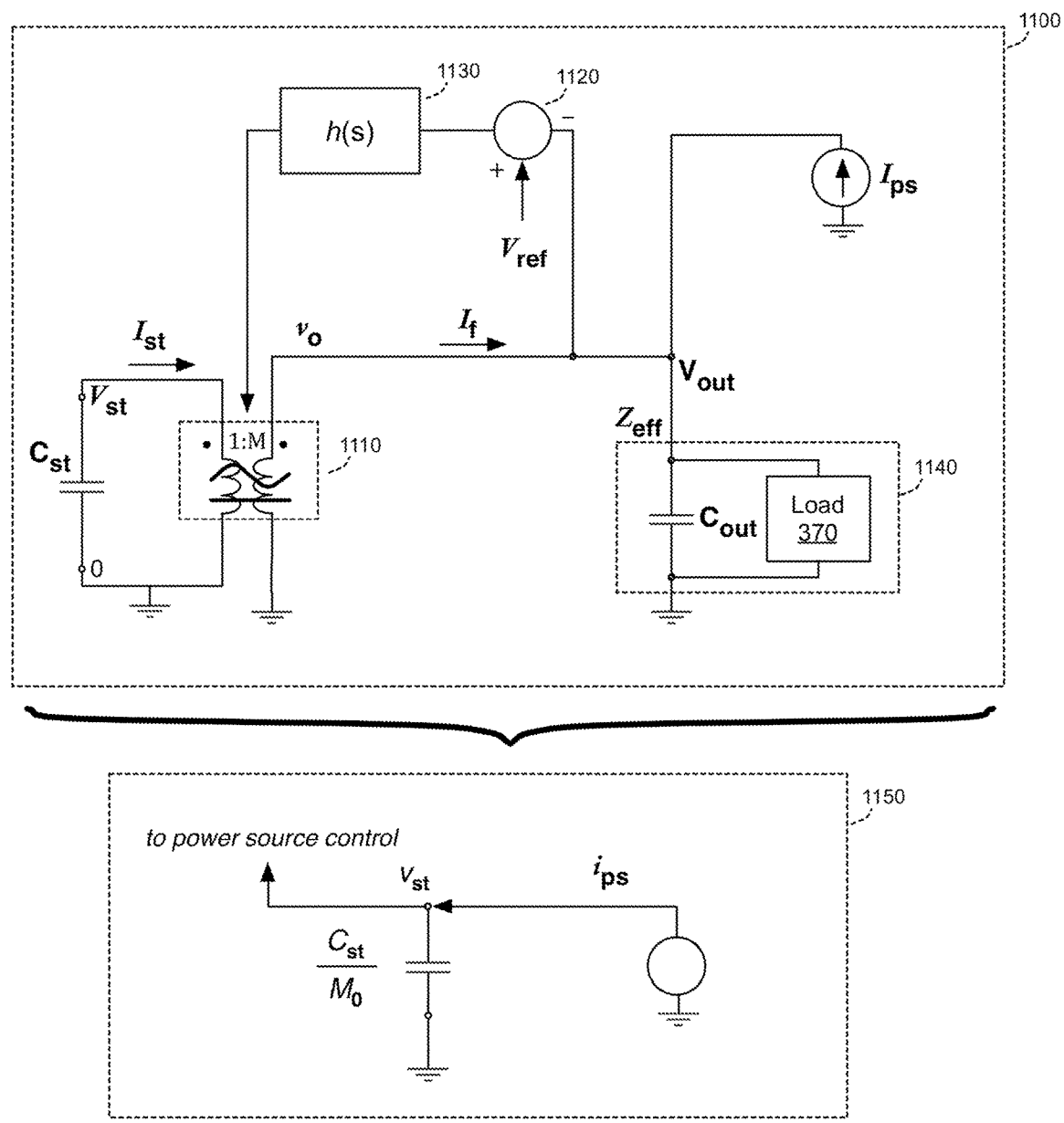
FIG. 11 shows a simplified model of the power supply block and the active filter, according to an embodiment.

FIG. 11 shows a simplified model of the power supply block and the active filter, according to an embodiment. Under a reasonable set of assumptions, initial design of the control networks of the power source and active filter may be performed in a substantially decoupled fashion. To clarify the procedure, a simplified model of the power source/active filter network is depicted as model 1100 in FIG. 11. On the time scale of interest for control of the power source, it is possible to neglect the presence of the active filter inductor, providing a useful simplification of the analysis. The power source is treated as a current injector $I_{ps}$, whose transimpedance $dV_{st}/dI_{ps}$ is the quantity of interest for linear control of the power source. The active filter is considered to be an ideal transformer 1110, with multiplication factor M. (In the case of an ideal buck converter, the conversion ratio M is equal to the duty cycle D, but this need not be the case for other architectures.) M is controlled by an idealized error amplifier 1120 and transfer function 1130. The output load is treated as an effective impedance 1140. The following relations are the result of these model assumptions:

$$V_{out} = MV_{st}$$

$$V_{st} = -\frac{I_{st}}{sC_{st}}; I_{st} = MI_f \rightarrow V_{st} = -\frac{MI_f}{sC_{st}}$$

$$I_f = \frac{V_{out}}{Z_{eff}} - I_{ps}$$

$$M = h(s)(V_{ref} - V_{out})$$

The equations are linearized by analyzing a perturbation (denoted by a small letter variable) imposed on a large but fixed value (denoted by the subscript "0"):

$$M = M_0 + m$$

$$I_f = I_{f0} + i_f \rightarrow i_f$$

$$V_{out} = V_{out,0} + v_o$$

$$V_{st} = V_{st,0} + v_{st}$$

It is here assumed that the storage capacitor current is 0 on average, so that $I_{f0}=0$. Neglecting products of small quantities, a simplified expression for the transimpedance can be derived:

$$v_{st} = \underbrace{\frac{M_0 Z_{eff}[1 + hV_{st0}]}{M_0^2 + sC_{st}Z_{eff}[1 + hV_{st0}]}}_{Z_{trans}} i_{ps}$$

In the limit of large gain h of the active filter, the expression simplifies to:

$$Z_{trans} = \frac{M_0}{sC_{st}}$$

That is, the transimpedance of the active filter, as seen by the power source, is simply that of a capacitor whose value is scaled by the average conversion ratio of the active filter, as shown in box 1150 of FIG. 11.

Following the same procedure, the ratio of the change in output voltage to the injected current is obtained, the effective output impedance seen by the power source:

$$\frac{v_o}{i_{ps}} = \frac{M_0^2 Z_{load}}{M_0^2 + sC_{st}Z_{load}[1+hV_{st0}]}$$

In the limit of large gain h this can be written:

$$Z_{PSout} = \frac{M_0^2}{sC_{st}hV_{st0}}$$

The small-signal output impedance seen by the power source is very small when the storage capacitor and control gain are large.

As note previously in connection with FIGS. 1A, 1B-5, it is advantageous to incorporate the average power source inductor current in the control model for the power source. For an embodiment, a current proportional to the power source inductor current, or the average of the inductor current associated with each phase when a multiphase system is employed, is injected into the feedback node of the error amplifier.

Figure 12:
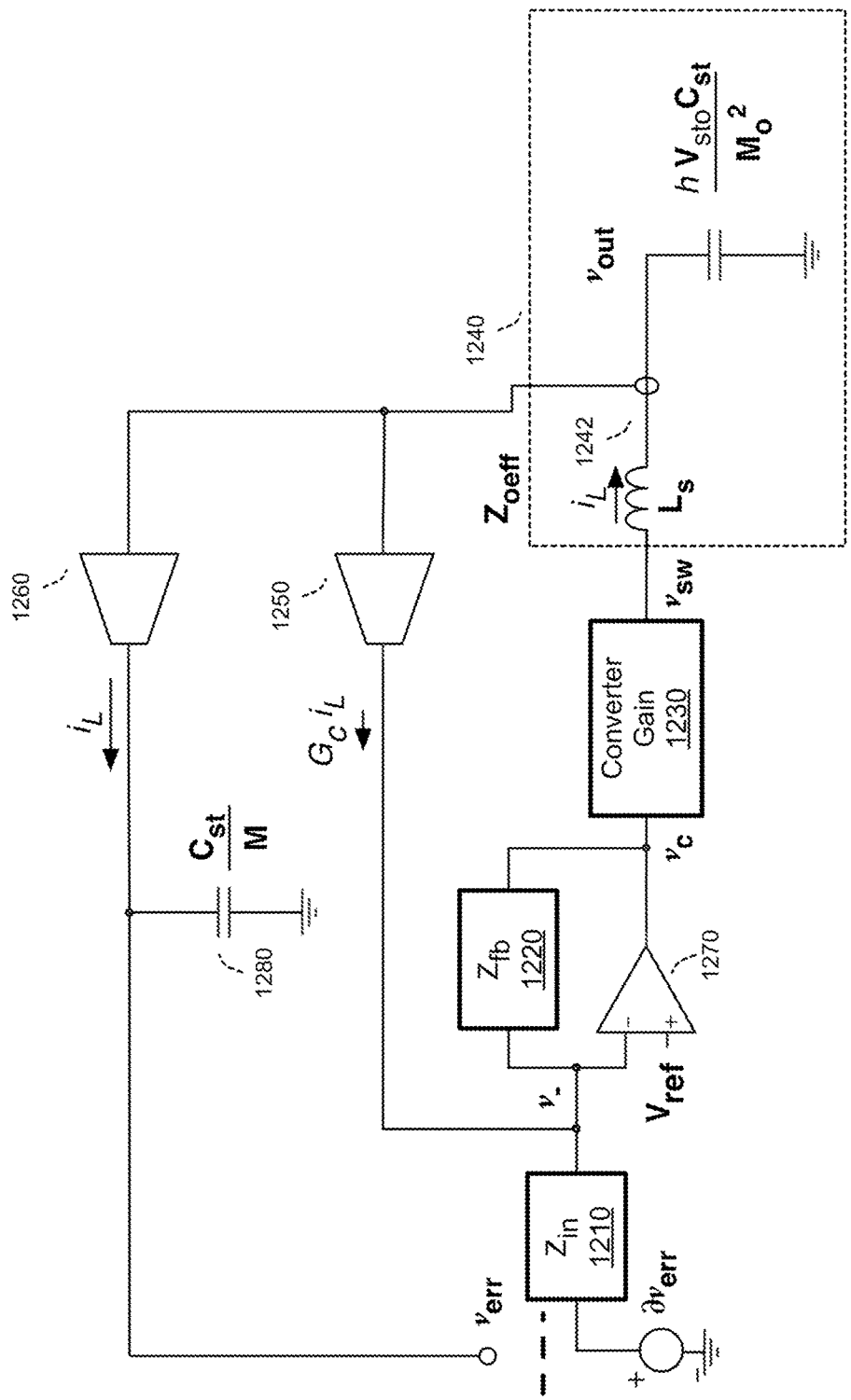
FIG. 12 shows a control architecture for a single phase wherein the voltage control loop is broken prior to the input impedance of the error amplifier, according to an embodiment.

FIG. 12 shows a simplified control architecture for a single phase wherein the voltage control loop is broken prior to the input impedance of the error amplifier, according to an embodiment. Specifically, FIG. 12 incudes a resulting control architecture for the case of a single phase, where the voltage control loop is broken prior to the input impedance $Z_{in}$, block 1210, of the error amplifier. An injected voltage $\delta v_{err}$ results in injection of a current into node $v_-$, which can be approximated as held at the voltage $V_{ref}$ by the operational amplifier 1270. This current must be balanced by the sum of the injected current $G_c i_L$ from transconductance amplifier 1250, and the current into the feedback impedance $Z_{fb}$, block 1220. Considering small-signal quantities only, the control voltage perturbation is:

$$v_c = -\left(\frac{Z_{fb}}{Z_{in}}\partial v + G_c Z_{fb} i_L\right)$$

The control voltage $v_c$ is amplified by the gain of the converter 1230, roughly $(V_{IN}/V_{tri})$, where $V_{IN}$ is the input voltage to the converter and $V_{tri}$ is the amplitude of the triangle or sawtooth wave used for control of the duty cycle, as depicted in e.g. blocks 670 and 680 of FIG. 6, to produce the average switch node voltage $v_{sw}$. The inductor current can be approximated as:

$$i_L = \frac{v_{sw}}{Z_{oeff}}$$

Here $Z_{oeff}$ is the effective input impedance of the network 1240 consisting of the power source inductor $L_s$, and the effective capacitance of the output in the presence of the active filter, as derived previously. As noted previously, in the frequency range where the active filter gain is large, the output impedance seen by the power source is small, and the impedance $Z_{oeff}$ will be dominated by the inductor impedance. The resulting inductor current, as noted above, is sensed and fed back in the inner current control loop formed by sensor 1242 and transconductance amplifier 1250. A replica of the sensed inductor current, from transconductance amplifier 1260, is injected into scaled transimpedance capacitor 1280 to produce the error voltage $V_{err}$, whose ratio to the injected voltage $\delta v_{err}$ is the open loop gain. Substituting for the control voltage, one obtains the inductor current as a function of the injected voltage:

$$i_L = -\left(\frac{V_{IN}Z_{fb}}{Z_{in}[V_{tri}Z_{oeff} + V_{IN}Z_{fb}G_c]}\partial v\right)$$

This current is then multiplied by the transimpedance of the storage capacitor through the active filter to obtain the error voltage, and thus the open-loop gain:

$$G_{loop} = -\left(\frac{M_0 V_{IN} Z_{fb}}{sC_{st}Z_{in}[V_{tri}Z_{oeff} + V_{IN}Z_{fb}G_c]}\right)$$

Thus, by increasing the current gain $G_c$, the response of the power source can be made less dependent on the output network, and instead controlled primarily by the compensator impedances $Z_{in}$ and $Z_{fb}$. It is thus possible to make the loop gain of the power source look roughly like a simple first-order (1/s) function of frequency, simplifying compensation design. This provides additional flexibility to the designer in specifying compensation, and allows for improved phase margin and stability.

At very low frequencies, where the active filter is not effective and capacitive displacement currents are negligible, the output impedance may be dominated by the load resistance, and the open-loop gain in the current-controlled limit becomes $$G_{loop,DC} = -\left(\frac{R_{load}}{Z_{in}G_c}\right)$$

If the load impedance is large (as may be the case when the load is approximated as a fixed current sink, or when a digital load is gated off), the loop gain will become limited by the intrinsic gain of the operation amplifier used. In either case, DC gain must be large enough to provide the absolute output regulation accuracy desired.

The use of inductor current feedback can improve the energy efficiency of the overall converter in the presence of step changes in the load current (load transients). For example, consider a step increase in load current (an upward load transient) from a low level $I_{low}$ to a high level $I_{high}$, for a time $\tau_{tran}$, after which the current returns to the low level $I_{low}$. If the Active Filter is treated as nearly ideal, the output voltage will remain constant during the load transient. The Active Filter will initially supply the additional load current $(I_{high}-I_{low})$, causing the voltage on storage capacitor $V_{st}$ to fall. The Power Source, if controlled only by the storage capacitor voltage, will detect the fall in the storage capacitor voltage and increase its commanded conversion ratio, causing the inductor current $I_L$ to increase. After some delay $\tau_{PS}$, the inductor current from the power source will have risen to equal the load current. The storage capacitor voltage will have fallen by approximately $$\Delta V_{st} \approx \frac{(I_{high} - I_{low})\tau_{PS}}{2MC_{st}}$$

where M is the conversion ratio of the Active Filter (see FIG. 11), and the net current provided by the Active Filter will be approximately zero. However, since the storage capacitor voltage is still below the target voltage, the conversion ratio of the Power Source will continue to rise, as will the Power Source inductor current. In order to maintain the output voltage, the Active Filter will draw current from the output node and recharge the storage capacitor. After the storage capacitor reaches the target voltage, the Power Source will recover to a steady-state condition. At the end of the load transient, the same process occurs in reverse: the Active Filter will withdraw current from the output to maintain the voltage constant, increasing the storage capacitor voltage. The Voltage Source will reduce its own inductor current to below that required by the load, so that the storage capacitor can discharge. As a consequence, currents larger than the load current flow through the Power Source, causing additional power dissipation and reduced efficiency.

A more efficient control approach allows the storage capacitor voltage to fall to a reduced level at the beginning of an upward load transient and remain at the reduced level until the end of the upward load transient, on the presumption that the storage capacitor voltage will recover at the end of the load transient. In analogy to the known technique of output voltage positioning, this control approach may be denoted storage capacitor voltage positioning. Voltage positioning of the storage capacitor may be accomplished by using the storage capacitor voltage combined with the measured Power Source inductor current to control the conversion ratio of the Power Source. The effect of the Power Source inductor current on the target voltage for the storage capacitor should be set to allow the storage capacitor voltage to fall by the amount expected for an upward load transient reaching the measured current value.

In an embodiment, the signal from the current sensor, such as the current from transconductance amplifier 690 of FIG. 6, may be injected into the negative input of an error amplifier, such as 660, where it is combined with the signal from the storage capacitor voltage. For times longer than the RC time constants of the compensation blocks, such as 630 and 620, the current signal from transconductor 690 will encounter a substantially resistive impedance $Z_{EA}$, and thus be converted to an injected voltage:

$$\Delta V = -Z_{EA} G_c I_L$$

where $G_c$ is the equivalent gain of the current sensor and transconductance amplifier. The consequent decrease in the target voltage of the storage capacitor should be equal to that expected from the corresponding load transient response when the Power Source inductor current has reached the load current:

$$\Delta V_{st} \approx \frac{(I_{high} - I_{low})\tau_{PS}}{2MC_{st}} = Z_{EA} G_c (I_{high} - I_{low}) \rightarrow Z_{EA} G_c = \frac{\tau_{PS}}{2MC_{st}}$$

Thus, the current sensor injects a voltage proportional to the Power Source output current, where the injected voltage at the error amplifier is set equal to the product of the response time of the Power Source and the sensed output current, divided by twice the product of the storage capacitance value and the Active Filter conversion ratio.

Accordingly, for at least one embodiment, the power source block includes a current sensor, wherein the current sensor operative to sense an output current of the power source block. For at least some embodiments, the control of the conversion ratio is implemented by injecting a voltage proportional to the sensed output current into an error amplifier (such as, error amplifier 660) of the power source block, wherein the injected voltage divided by the sensed output current is substantially equal to a response time of the power source block divided by a product of the conversion ratio of the active filter and twice a capacitance of the storage capacitor, and wherein the response time is time required from a moment a load current of the output load change occurs to a time an inductor current of the output inductor becomes substantially equal to the load current.

A more general approach to establishing the required gain of the current sensing loop may be specified as follows. The operation of the power source and active filter are simulated using only the storage capacitor voltage $V_{st}$ as a control input for the power source conversion ratio. The transient simulation should include an example of an expected sudden increase in load current, and the corresponding return to the original current. Associated with each sudden change in load current is a transient decrease or increase, respectively, in the storage capacitor voltage. The current gain is then adjusted so that, when the power source current equals the load current at the end of the sudden increase or decrease in load current, the new storage capacitor target is equal to the minimum or maximum storage capacitor voltage observed during the corresponding transient without current control. When properly adjusted as described above, the storage capacitor voltage will simply fall to the lower value when the system encounters a sudden increase in load current, and remain there until the load current returns to its original value, whereupon the original storage capacitor voltage is also restored. However, the current gain (and consequent effective load line for $V_{st}$) are constrained by the need to provide enough supply voltage to the active filter to allow it to regulate the target voltages successfully, and the need to avoid excessively high input voltages that might damage the active filter transistors. The control bandwidth of the power source may influence the response of the system to repeated load transients.

Figure 13:
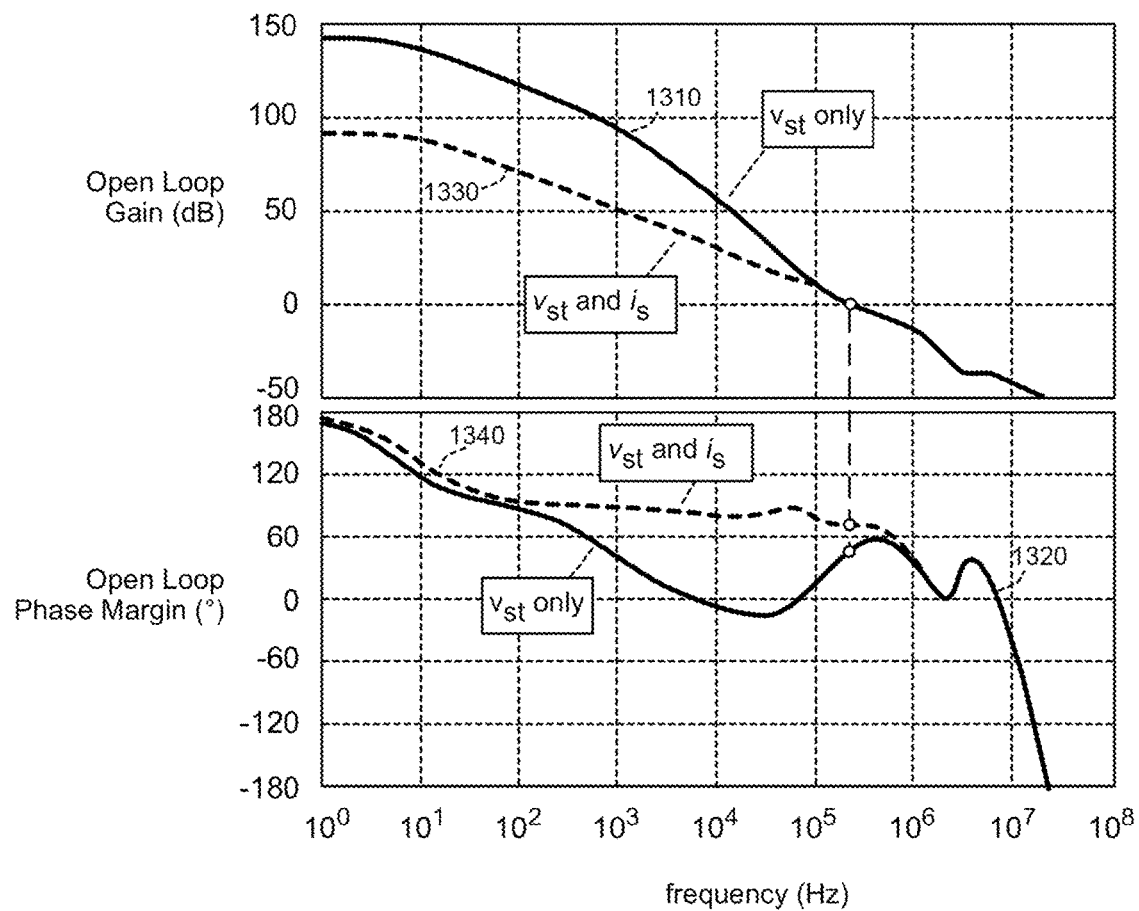
FIG. 13 shows a Bode plot (magnitude and phase of open loop gain) for the power source controller, according to an embodiment.

FIG. 13 shows a Bode plot (magnitude and phase of open loop gain) for the power source controller, according to an embodiment. The solid lines 1310 and 1320 depict the magnitude and phase of open loop gain in the case where only voltage-mode control is used; that is, where the transconductance amplifier 790 of FIG. 7 is not active. The dotted lines 1330 and 1340 show the corresponding magnitude and phase when combined voltage and inductor current control is used. The gain at low frequencies is reduced by the use of mixed voltage/current control, but the phase margin is significantly improved in the region between about 1 and 100 kHz, leading to improved robustness and control stability.

The load current may be used instead of the power source inductor current as an input to the power source switching controller 330 or 430. However, speed of response may be impaired by this arrangement. The load current can rise rapidly when the load behavior changes, due to the rapid response of the active filter. As a consequence, the target voltage for the storage capacitor, $v_{st}$, falls. If the storage capacitor is large, it will remain above the target for a relatively long time compared to the transient response of the active filter. During this time, the power source will reduce its output current, even though the load demand has increased, and the time delay before the power source current becomes equal to the new load current is increased.

The discussion of control issues above applies both to single phase converters, as depicted in FIGS. 1A, 1B-3, and multiphase converters, as depicted in FIG. 4, as long as the average current of all phases is employed. Multiphase converters may require additional provisions, not shown, for ensuring current balance between the phases of the power source, and optionally the active filter, such as a separate R-C filter for each phase.

Design of the active filter control network may employ any conventional compensation approach as guided by the application, including voltage mode control or current mode control, analog compensation networks or analog or digital proportional-integral-differential (PID) control. As shown by the analysis above, the range of frequency over which active filter gain is high should overlap that in which the power source control operates, and should extend to higher frequency than the power source, to permit a slow and thus efficient power source while preserving transient response, as described for example by Lambert et. al. Note that the phase margin of the active filter control is weakly influenced by the bandwidth of the power source.

For an embodiment, the conversion ratio of the power source block is at least partially controlled by the parameter related to the voltage on the storage capacitor during a first mode of the voltage regulator, and the conversion ratio of the power source block is not controlled by the parameter related to the voltage on the storage capacitor during a second mode of the voltage regulator, and the voltage regulator is operative to change between the first mode and the second mode.

The active filter, when switching, incurs losses due to the need to change the switch transistor states, and switching losses due to ripple current flowing through the transistors during the switch moment (if zero-voltage or zero-current switching is not in use). Efficiency can be improved if the active filter is turned off when it is expected that only a constant or slowly-changing voltage and current will be delivered to the load, and thus voltage scaling and fast load transient response are not needed. Thus it can be beneficial to provide a second operating mode, in which the active filter is off, and the power source conversion ratio control is based in the conventional fashion on the output voltage, using any conventional control means such as voltage mode or current mode control. In this conventional mode, a large output capacitance, which is undesirable when dynamic voltage scaling is envisioned, is useful to provide charge for transient changes in the load current. A separate switch may be used to connect and disconnect a large-value output capacitor, and manage voltage changes thereof with minimal disturbance to the normal operation of the power source, as described in U.S. Pat. No. 9,069,365. Because, as described above, the transimpedance seen by the power source is dominated by the large storage capacitor impedance during operation in the first mode, the same power source compensation network may be used in the second mode with a conventional large output capacitance. It has been observed that attempting a mode transition with large active filter output current present can lead to unstable control behavior. Transition to and from this conventional operating mode should be performed when the load conditions are stable and the active filter average current is small or zero.

More rapid transitions to the conventional mode after current transients can be obtained when, as described above, power source average inductor current is included in the power source control input, so that the target storage capacitor voltage is allowed to fall when load current increases. Efficiency is improved both due to reductions in power source RMS output current, and consequent resistive losses, and a shorter time during which the active filter is switching.

Changes from the first to second mode and back, as described above, may require changes in the compensation configuration to maintain stability. Many approaches to compensation employ the equivalent of an integral of the controlled parameters as a state variable, for example the integral input of a Proportional-Integral-Derivative (PID) controller, or the stored voltages of internal capacitive nodes in the impedance network of an error amplifier. It may also be necessary to preset the values of the state variables at a mode change to avoid sudden changes in the output voltage.

Figure 15:
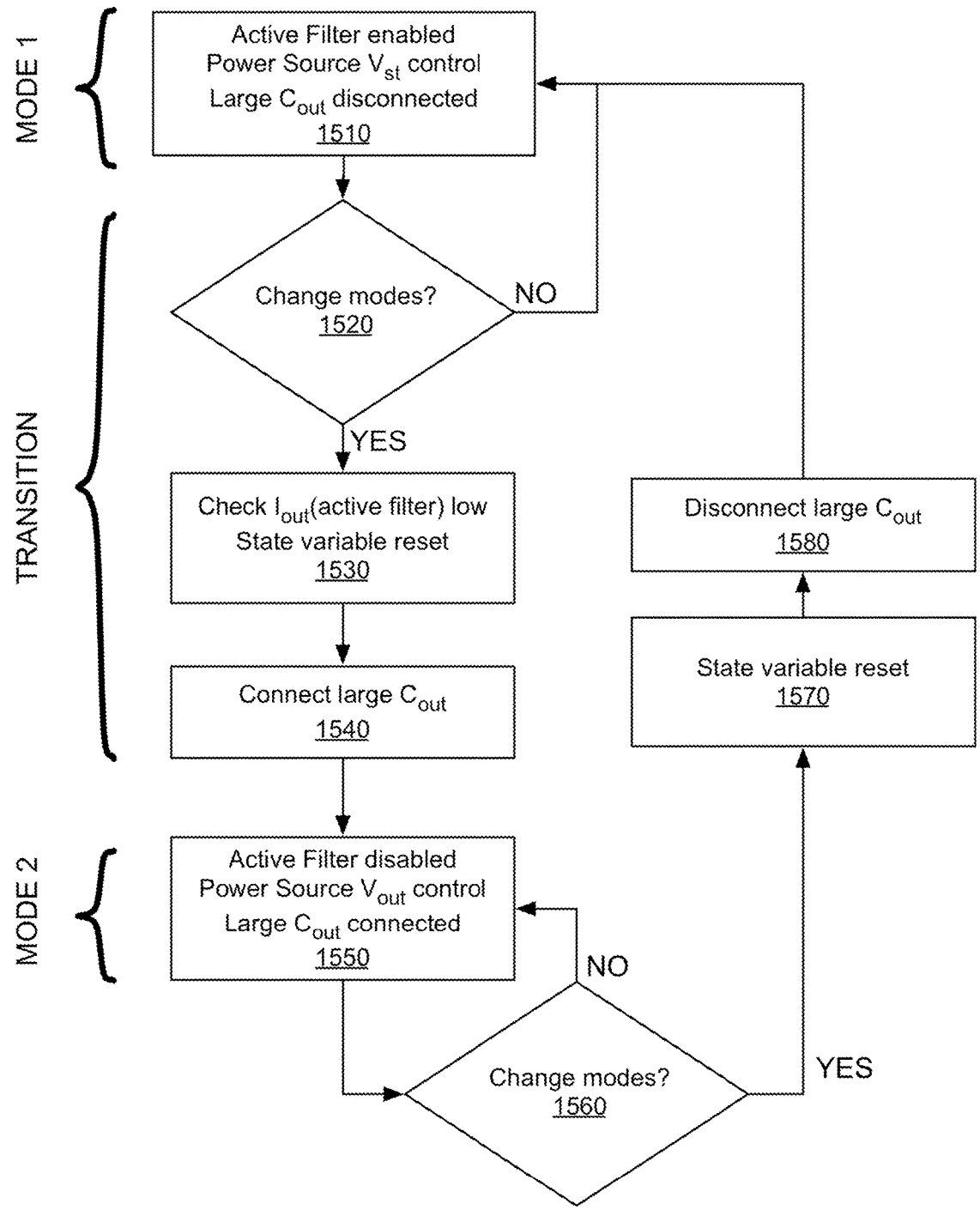
FIG. 15 is a flow chart that includes steps of a method of multimode operation, according to an embodiment.

FIG. 15 is a flow chart that includes steps of a method of multimode operation, according to an embodiment. Assuming that the system is in Mode 1 operation (1510). During operation in Mode 1, the active filter is enabled, and the conversion ratio of the power source is controlled by the storage capacitor voltage, and optionally the inductor current. The output capacitance is minimized to permit dynamic voltage scaling. When a mode change is commanded (1520), the system may first perform optional configuration checks (1530): it may be desirable to verify that the active filter output current is small to ensure stability, and to preset the values of state variables to avoid changes in output voltage at the mode change. The large output capacitance described above may then be connected to the output (1540), optionally with the capacitor charging provisions described in U.S. Pat. No. 9,069,365. The control system can then transition to Mode 2 operation, in which the active filter is disabled, the power source conversion ratio is controlled by a parameter related to the output voltage, and a large output capacitance is connected (1550). When a mode transition is again commanded (1560), as for example when dynamic voltage scaling or other transient conditions are expected, the system may first perform any required presets of state variables (1570), and disconnect the large output capacitor (1580). The system may then return to operation in Mode 1.

Control design must account for certain exceptional conditions not encountered with a single power source. If at startup both power source and active filter are enabled with non-zero target values for the output and storage capacitor voltage, but the storage capacitor is not precharged, the active filter will rapidly be driven to a duty cycle of 1. The power source will charge the storage capacitor until the desired output voltage is reached, at which point the active filter will regulate the output voltage while negative current flows into the storage capacitor. This startup procedure results in smooth, stable transition to the operating state, but requires that the active filter circuitry be separately powered during the time that the storage capacitor is being charged. Considerable simplification of the active filter results if the internal circuitry is powered from the storage capacitor voltage, but in that case the capacitor must be charged before active filter startup. However, if separate provisions, such as a conventional resistive regulator, are made to precharge the storage capacitor to its target voltage prior to startup, simultaneous startup of power source and active filter will result in rapid adjustment of the output voltage by the active filter, while the power source, if started at duty cycle D=0, has made no changes since the storage capacitor is at the target. The power source shunt device will then sink current from the output until the storage capacitor voltage falls and causes the duty cycle D to rise. This results in an unnecessary and inefficient transfer of charge from the storage capacitor to the system input and back. The problem may be avoided by setting the duty cycle of the power source to its estimated value at startup, where the estimated value for a buck converter configuration is obtained as the ratio of the input voltage to the target output voltage. Alternatively, the power source may be started in the second operating mode, as described above in connection with Mode 2 of FIG. 15, where it performs conventional control of the output voltage, and then the system is switched to the control mode of the described embodiments (Mode 1) only when the output voltage has stabilized at the target value.

While the control approach of the described embodiments provides good stability and uncoupling of the power source and active filter control paths in the small-signal regime, attention must be paid to the nonlinear behavior of the component parts. In the embodiments shown in FIGS. 2, 3, and 4, the bidirectional Active Filter 240 is configured as a buck regulator. However, the Active Filter buck 240 is connected backwards in the feedback path of the Power Source buck 210, which presents a control problem much like that seen with a boost regulator. In the backward path of the Active Filter buck 240, when sinking current from the output, the input source capacitor $V_{st}$ 190 of the Active Filter is disconnected if the Active Filter duty cycle goes to 0 (that is, the shunt switch $Q_{sh,f}$ is on continuously), essentially breaking the feedback path of the Power Source buck 210. Because of this, a scenario can arise where the system can 'lock up'.

If $V_{st}$ is below target and $V_{out}$ is above target, then the Power Source buck regulator 210 will source current into $V_{out}$, while the active filter will sink all the current to ground. None of the energy gets back to $V_{st}$ capacitor 190 and so a sustained lockup occurs where the Power Source buck continuously sources current and the Active Filter buck continuously sinks current to ground, with no feedback path to $V_{st}$ capacitor 190. This lock up is most likely to occur when the on-resistance of the Power Source 210 is less than that of the Active Filter 240, such that the Active Filter cannot sink the current provided by the Power Source while maintaining regulation. As a result, the output voltage climbs and regulation is lost.

By comparison, the reverse situation where $V_{st}$ is above target and $V_{out}$ is below target, does not break the feedback path of the Power Source buck, because the Active filter will be directing current from $V_{st}$ to $V_{out}$ all the time, which will keep this path connected.

The use of a current signal (voltage positioning), as discussed above to adjust the target voltage of the storage capacitor depending on the output current of the power source, is helpful to reduce the likelihood of encountering the runaway condition. The active filter control design may be modified to account for the maximum boosted current limitation and consequent nonlinearity, for example by implementing minimum duty cycle limit for the active filter, or a negative current limit and anti-windup control provision.

EXAMPLE 1

Figure 8:
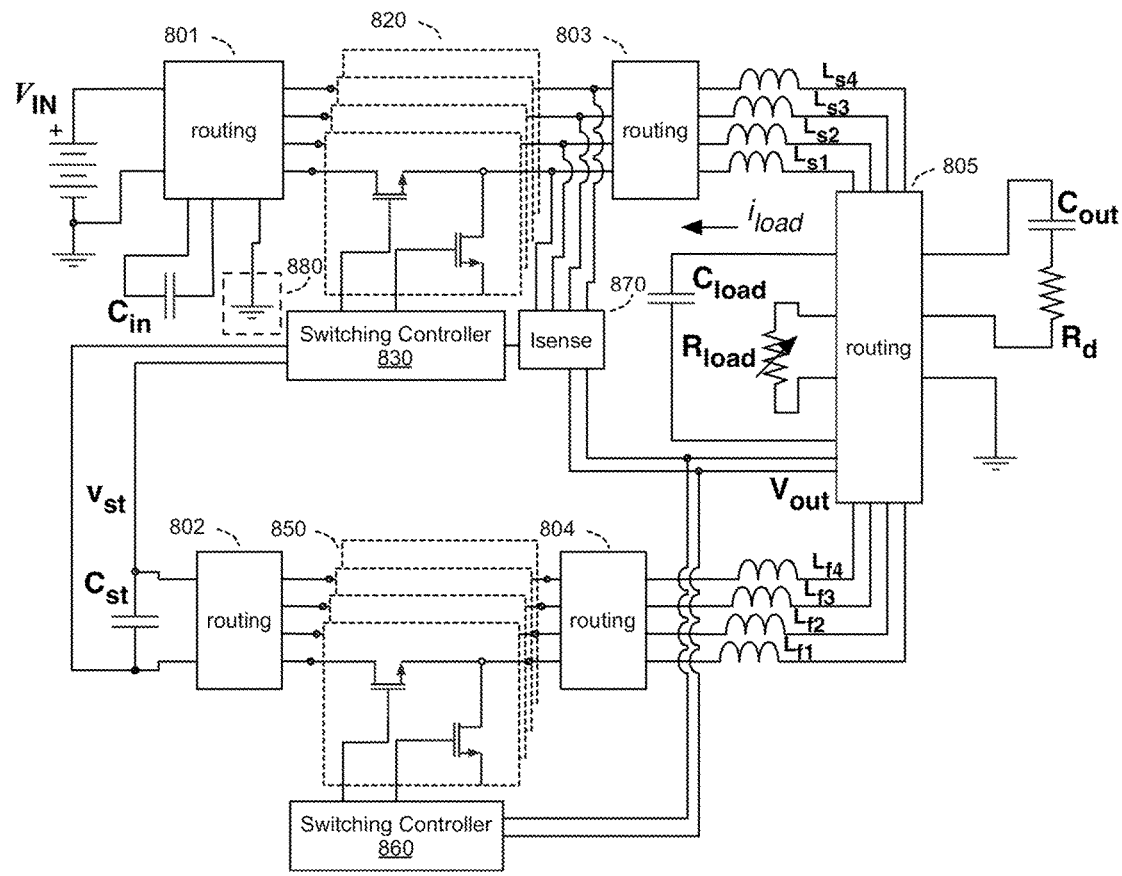
FIG. 8 shows a power source and an active filter, according to another embodiment.

FIG. 8 shows a power source and an active filter, according to another embodiment. The blocks 820 and 830 correspond to the four-phase power source converter and switching controller 430, and the blocks 850 and 860 to the four-phase active filter and switching controller 460, as depicted in FIG. 4. The blocks 801, 802, 803, 804, and 805 are simplified models for the various parasitic capacitances, inductances, and resistances associated with a specific physical configuration (in this case, using a printed circuit board). The voltage on the storage capacitor $V_{st}$ is differentially sensed by Switching controller 830, which contains the $V_{ref}$ generation provisions described in connection with block 640 of FIG. 6 and FIG. 7. Block 870 contains the average current sense circuit described in connection with FIG. 5. The differentially-sensed output voltage is also provided to active filter switching controller 860. Both blocks 820 and 850 use stacked NMOS switching elements. Blocks 820 use a cascode switching configuration, while blocks 850 employ a single switching device for each shunt and series switch, without cascode protection, since the storage capacitor voltage is low enough to permit unprotected operation. The power source and active filter are implemented in a conventional 180 nm CMOS process. $C_{in}$ is the parallel combination of two nominal 1-microFarad surface-mount capacitors, and provides local input decoupling. Box 880 is a local ground potential, modeling the effect of parasitic impedances between true ground and the local reference ground for the switching converters and controls 820, 830, 850, and 860. Inductors $L_{s1}$ to $L_{s4}$ are modeled as nominal 330 nH surface-mount components; the inductors $L_{f1}$ to $L_{f4}$ are modeled as nominal 20 nH surface-mount components. $C_{st}$ is implemented as two nominally 10-microFarad surface-mount capacitors. $C_{out}$ is a roughly parallel combination of four nominal 220 nF capacitors, each with 100 milliOhms of series resistance to improve active filter control stability. $C_{load}$ and $R_{load}$ are distributed among 16 nominally-parallel segments, each containing about 6 nF total capacitance, so that the lumped equivalent load capacitance is about 96 nF. The overall load resistance can be varied from a large value, such that DC load current is negligible, to about 0.15 Ohm, with varying ramp rates, to simulate load transients in a digital system. Input voltage $V_{IN}$ is set to 3.7 V.

Figure 9:
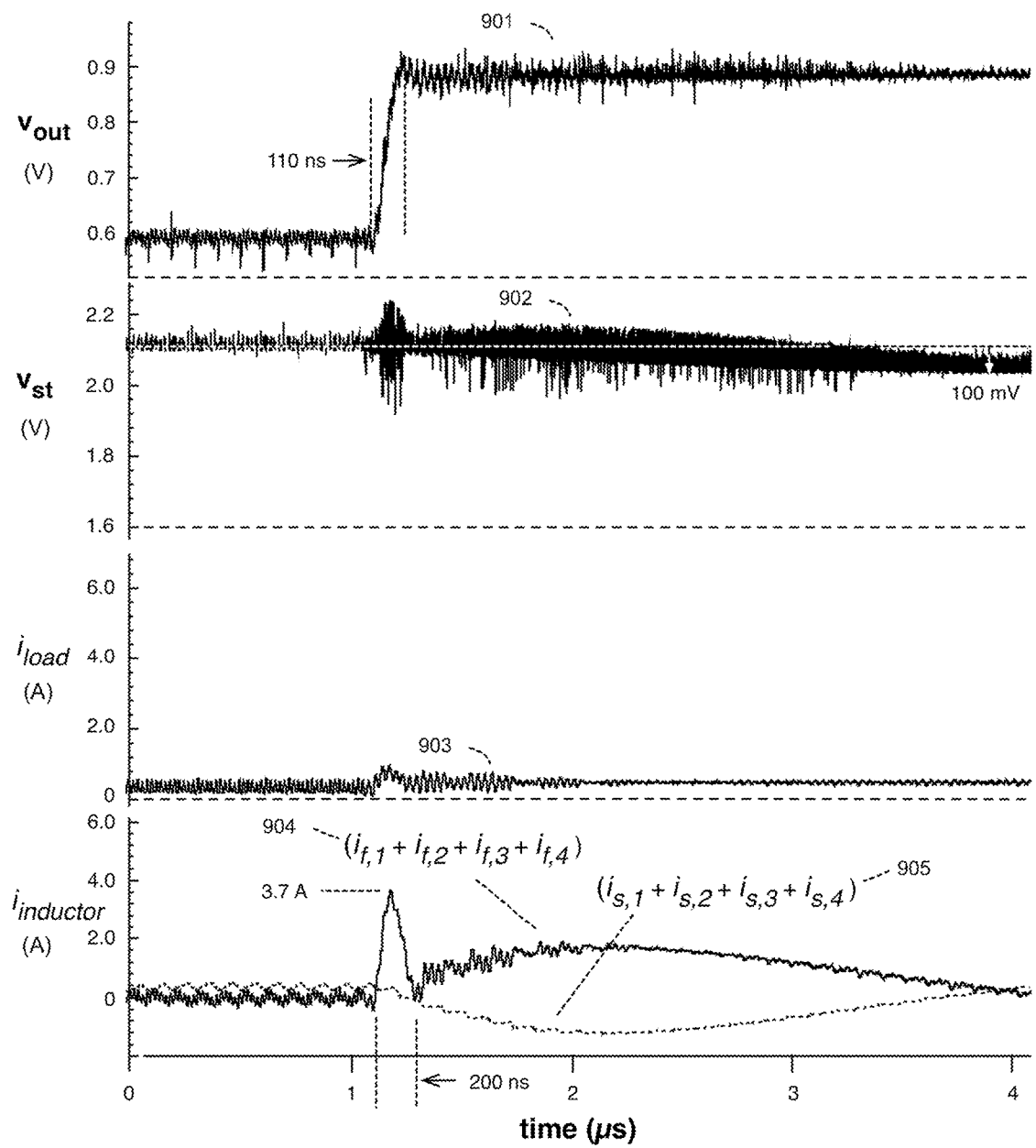
FIG. 9 shows results of simulated performance of the power source and active filter of FIG. 8 during an output voltage step, for the embodiment of FIG. 8.

FIG. 9 shows results of simulated performance of the power source and active filter of FIG. 8 during an output voltage step, for the embodiment of FIG. 8. The output voltage vs. time, is shown as trace 901. A voltage step upward is initiated at about 1.2 microseconds, and is completed within about 200 nsec, with minimal overshoot. The storage capacitor voltage, shown as trace 902, falls by about 100 mV over 3 microseconds, as charge is drawn into the output and load capacitances. This charge is later replenished by the relatively slow power source (not shown in the timescale of the figure). The load current, depicted as trace 903, is low in this example, and shows only a slight temporary increase due to charging of the load capacitance. Trace 904 depicts the sum of the four inductor currents associated with the four phases of the active filter converter, 441. Similarly, trace 905 depicts the sum of the four inductor currents associated with the four phases of the power source converter, 421. The active filter current 804 rises rapidly to about 3.7 A to supply the charge required to increase the voltage on the output capacitances $C_{out}$ and $C_{load}$, and returns to a small value about 200 ns later. Since the output voltage has increased, current is slowly driven back through the power source inductors $L_{s1}$ through $L_{s4}$ towards the input supply $V_{IN}$, as shown by the dip in trace 905 around 1.5 to 2.5 microseconds. This current is compensated by positive current from the active filter to keep the output voltage constant. After about 2 microseconds, the power source duty cycle has increased enough for the power source output current to recover to a positive value. The control of output voltage using the fast active filter has allowed a rapid change in output voltage with minimal overshoot and rapid, stable correction for the slow response of the power source. The power source is allowed to slowly correct its behavior to recharge the storage capacitor. Similar results are obtained for downward voltage steps, with the directions of the currents in the respective inductors being reversed.

Figure 10:
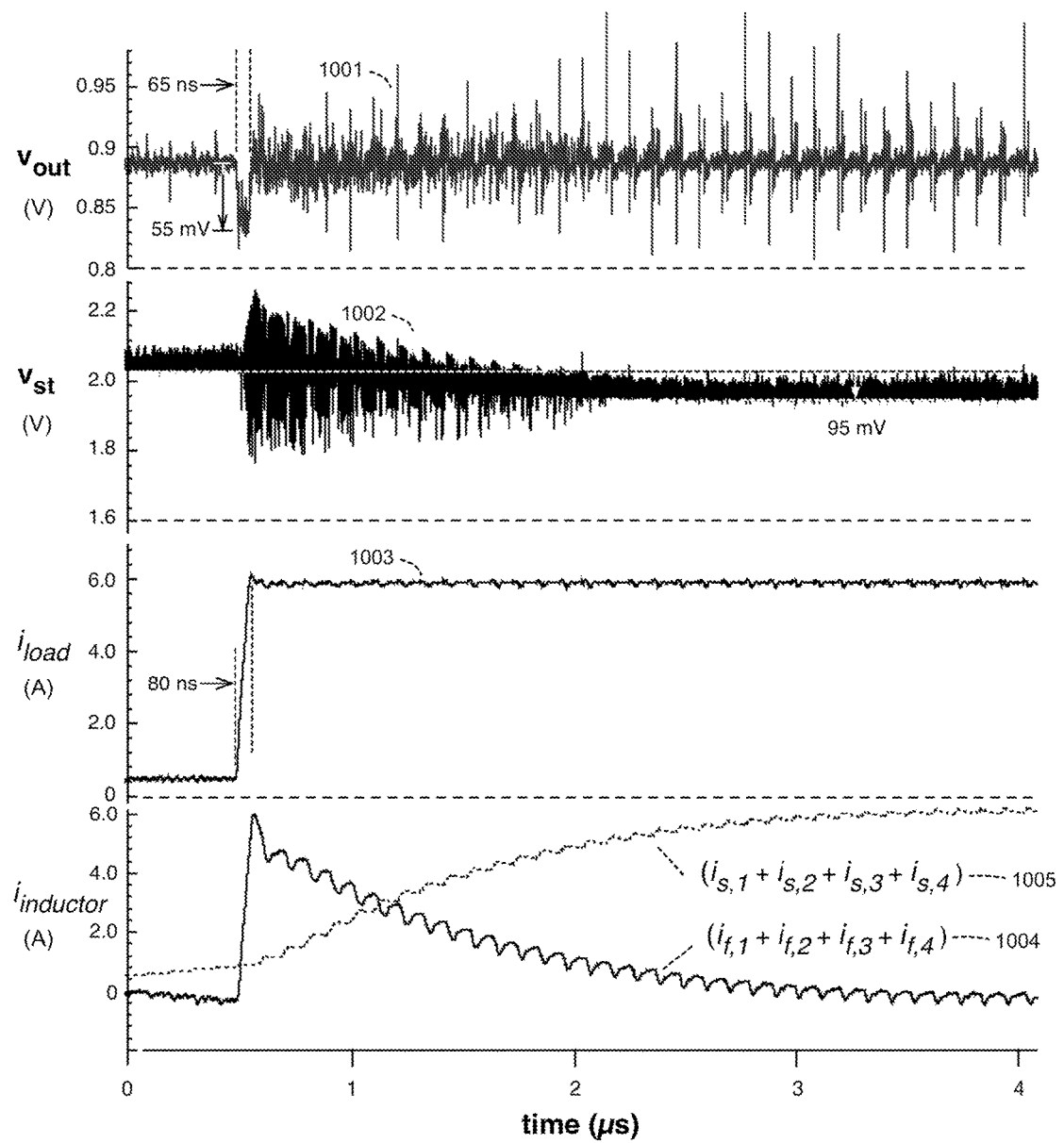
FIG. 10 shows results of simulated performance of the embodiment of FIG. 8 of the power source and active filter for a load current transient.

FIG. 10 shows results of simulated performance of the embodiment of FIG. 8 of the power source and active filter for a load current transient. The output voltage vs. time is shown as trace 1001. The storage capacitor voltage vs. time is depicted as trace 1002. The load current is shown as trace 1003. Trace 1004 shows the sum of the four inductor currents associated with the four phases of the active filter converter, 441, and trace 1005 shows the sum of the inductor currents associated with the four phases of the power source converter, 421. A step from about 0.08 to 6 A in load current, over about 80 ns, occurs at 0.5 microseconds, representing an upward load transient. The output voltage falls by about 55 millivolts, but rapidly recovers to the nominal value, by about 65 ns after the start of the transient. The active filter current 1004 rapidly rises to provide the current demanded by the load. The active filter current then slowly falls over the course of the next 2-3 microseconds as the power source current responds to the fall in the storage capacitor voltage $V_{st}$. The storage capacitor voltage falls by about 95 mV by 2.5 microseconds after the transient. The change in storage capacitor voltage is in good agreement with that expected from the approximate theory described above, using an Active Filter response time of 2.5 microseconds, and a conversion ratio of 3.7/0.9=4.1:

$$\Delta V_{st} \approx \frac{(I_{high} - I_{low})\tau_{PS}}{2MC_{st}} = \frac{(6 - 0.08)2.5}{2[4.1]20} \approx 0.090$$

The control configuration of the described embodiments provides rapid response to both voltage and load current steps without requiring fast response from the power source.

EXAMPLE 2

The power source buck converter corresponding to blocks 820, 830, and 870, and the active filter buck converter corresponding to blocks 850 and 860, were implemented in a single integrated circuit fabricated in a standard 0.18 micron CMOS process. The integrated circuit incorporated the capability described above for combining the sensed output current from block 870 with the storage capacitor voltage, as described in FIGS. 5, 6, and 7, allowing storage capacitor voltage positioning to be implemented in response to load transient events. A provision to disable the current sense transconductance amplifier 790, which was included for other reasons, was found in retrospect to allow a direct comparison between the control model of the described embodiments with and without storage capacitor voltage positioning. The combination of current sensor $v_{is\_sns}$ and transconductance amplifier 790 was configured to provide about 0.1 microA per Ampere of power source output current. The response of the compensator to this injected current is somewhat complex, but for times longer than one to two microseconds it can be regarded as a resistor, here about 180 kOhm. Thus the offset of the storage capacitor voltage, corresponding to the product $Z_{EA}G_c$ defined previously, is about 18 mV/A of output current. The integrated circuit was mounted on a conventional printed-circuit board to provide the additional external components shown in FIG. 8. The inductors $L_{s1}$-$L_{s4}$ were nominally 330 nH surface-mount components; the inductors $L_{f1}$-$L_{f4}$ were nominally 20 nH surface-mount components. The components $C_{out}$ and $R_d$ were implemented with eight pairs of nominal 100 nF surface-mount capacitors and 200 milliOhm surface-mount inductors, roughly equivalent to $C_{out}$=800 nF and $R_d$=25 milliOhms. The load was a custom emulation of a digital load, with effective capacitance $C_{load}$=75 nF and a controlled variable resistance $R_{load}$ used to create transient variations in the load current.

Figure 16:
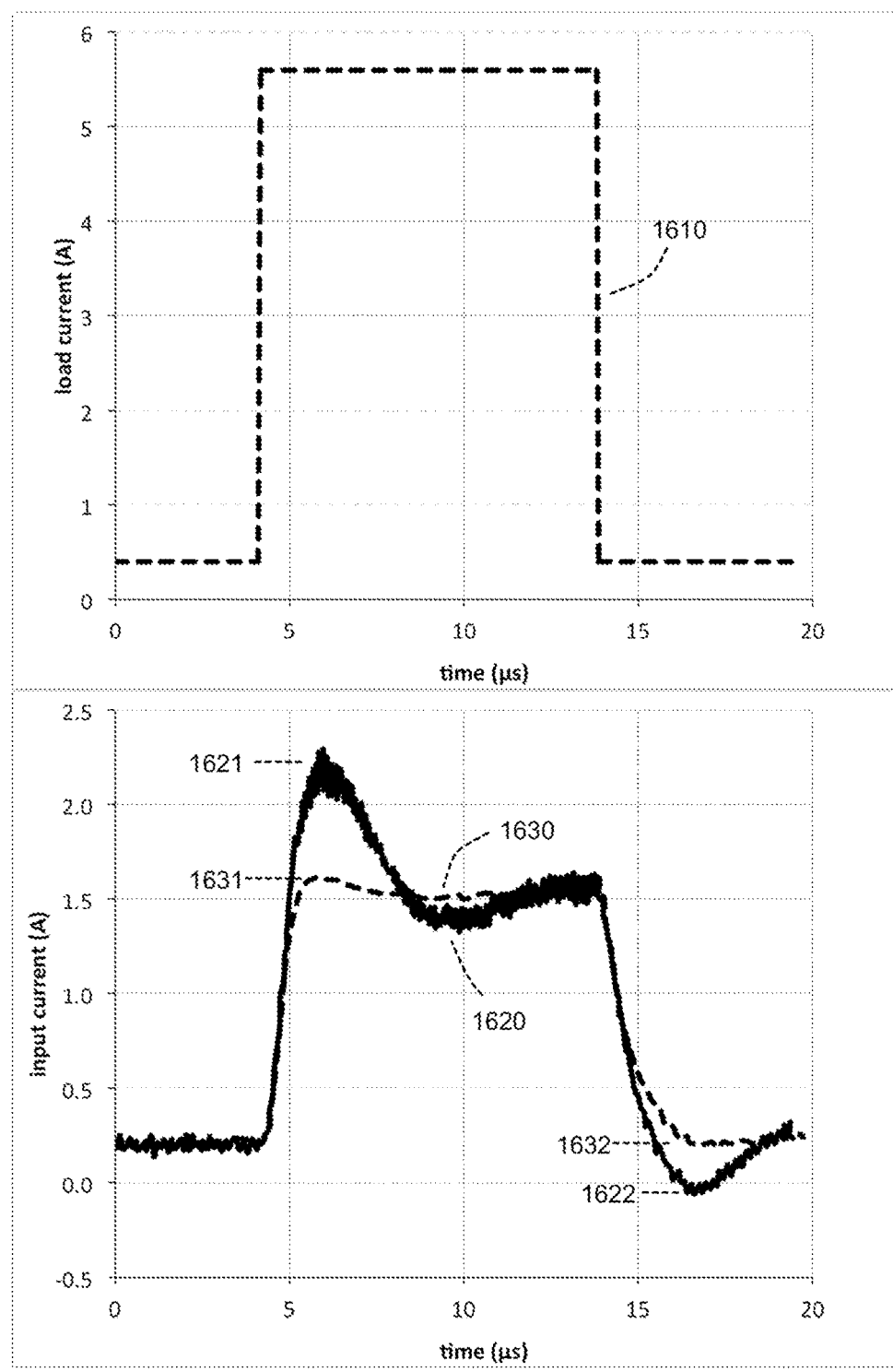
FIG. 16 shows an example comparison between input current during a transient with and without storage capacitor voltage positioning, according to an embodiment.

An exemplary comparison is shown in FIG. 16. A 25 milliOhm sense resistor was used to monitor the total input current to blocks 820 and 850, and the result captured with a differential probe into a digital oscilloscope. It should be noted that an additional 22 microFarads of decoupling capacitance was placed between the sense resistor and the integrated circuit, so only microsecond-timescale variations are captured, even though the load transient is much faster. The resulting signal was averaged over 16 triggered acquisitions and filtered to 20 MHz to minimize noise. The resistance $R_{load}$ was varied in order to create a nominal rising load current transient of about 0.4 to 5.6 A with a rise time of roughly 60 ns and duration of approximately 10 microseconds, depicted as curve 1610 of FIG. 16. The corresponding input current versus time when storage capacitor voltage positioning is not used is shown as curve 1620, and the input current when storage capacitor voltage positioning is used is shown as curve 1630. Consistent with the discussion above, when voltage positioning is not used and control is based solely on the storage capacitor voltage, the input current overshoots at the beginning of the transient (1621), as the power source controller attempts to return the storage capacitor to the (fixed) target voltage. A corresponding undershoot can also be observed when the load transient ends (1622). In contrast, when voltage positioning is enabled, the input current rises smoothly to a value only slightly above the stable value during the transient (1631), and falls smoothly back to the low-load-current value at the end of the transient (1632). For the sensitivity described above of 18 mV/A, the target for the storage capacitor voltage should decrease by about 94 mV once the power source current equals the load current, in excellent agreement with the simulated result shown in curve 1002 of FIG. 10. Thus, by adding a properly-calibrated current sense loop to the storage capacitor loop, the target voltage the power source attempts to control moves together with the storage capacitor voltage during the transient. Excess input current is avoided. Similarly, the target voltage recovers at the end of the transient, and excursions to negative input current (1622) are avoided.

Since the high peak current in region 1621 will cause additional resistive power dissipation in proportion to the square of the current, it is apparent that when the gain of the current sense loop is properly adjusted as described above, efficiency will be improved when load transients occur.

Although specific embodiments have been described and illustrated, the embodiments are not to be limited to the specific forms or arrangements of parts so described and illustrated.

What is claimed:
1. A voltage regulator comprising
   a power source block configured to convert an input voltage to an output voltage to supply current to an output load;
   a storage capacitor;
   an active filter configured to bi-directionally transfer energy between the output load and the storage capacitor;
   wherein a conversion ratio of the active filter is controlled based on the output voltage;

wherein a conversion ratio of the power source block is at least partially controlled by a parameter related to a voltage on the storage capacitor; and wherein when a load transient is encountered, the storage capacitor voltage falls to a reduced level, and remains at the reduced level until an end of the load transient.

2. The voltage regulator of claim 1, wherein the power source block comprises:
a series switch element;
a shunt switch element;
a switching controller, the switching controller operative to control opening and closing of the series switch element and the shunt switch element, wherein the opening and closing of the series switch element and the shunt switch element generates a switching voltage, and wherein filtering the switching voltage with an output inductor and a load capacitor generates the output voltage; and
wherein control of the conversion ratio of the power source block comprises control of the duty cycle of the opening and closing of the series switch element and the shunt switch element, and wherein the duty cycle is controlled by the parameter related to the voltage on the storage capacitor.

3. The voltage regulator of claim 2, wherein the power source block comprises a current sensor, the current sensor operative to sense an output current of the power source block; and wherein the duty cycle is controlled with a signal proportional to the sensed output current combined with a signal that is proportional to the voltage on the storage capacitor.

4. The voltage regulator of claim 3, wherein the switching controller comprises a power source compensation network that includes an error amplifier; and
wherein a signal from the current source is injected directly to an input of the error amplifier.

5. The voltage regulator of claim 1, wherein the power source block comprises a current sensor, the current sensor operative to sense an output current of the power source block, wherein the conversion ratio of the power source block is additionally controlled by a value of the sensed output current.

6. A voltage regulator comprising
a power source block configured to convert an input voltage to an output voltage to supply current to an output load;
a storage capacitor;
an active filter configured to bi-directionally transfer energy between the output load and the storage capacitor;
wherein a conversion ratio of the active filter is controlled based on the output voltage; and
wherein a conversion ratio of the power source block is at least partially controlled by a parameter related to a voltage on the storage capacitor;
wherein the power source block comprises:
a series switch element;
a shunt switch element;
a switching controller, the switching controller operative to control opening and closing of the series switch element and the shunt switch element, wherein the opening and closing of the series switch element and the shunt switch element generates a switching voltage, and wherein filtering the switching voltage with an output inductor and a load capacitor generates the output voltage;

wherein control of the conversion ratio of the power source block comprises control of the duty cycle of the opening and closing of the series switch element and the shunt switch element, and wherein the duty cycle is controlled by the parameter related to the voltage on the storage capacitor; and wherein the power source block comprises a plurality of phases of switched converters, and wherein a phase of each switched converter is offset in time to minimize a variation in a sum of output currents of the plurality of phases of switched converters.

7. The voltage regulator of claim 6, further comprising:
a current sensor operative to sense an average output current over phases of the plurality of phases of switched converters of the power source block, wherein the conversion ratio of the power source block is additionally controlled by a value of the sensed averaged output current.

8. A voltage regulator comprising
a power source block configured to convert an input voltage to an output voltage to supply current to an output load;
a storage capacitor;
an active filter configured to bi-directionally transfer energy between the output load and the storage capacitor;
wherein a conversion ratio of the active filter is controlled based on the output voltage;
wherein a conversion ratio of the power source block is at least partially controlled by a parameter related to a voltage on the storage capacitor;
wherein the conversion ratio of the power source block is at least partially controlled by the parameter related to the voltage on the storage capacitor during a first mode of the voltage regulator, and the conversion ratio of the power source block is not controlled by the parameter related to the voltage on the storage capacitor during a second mode of the voltage regulator, and the voltage regulator is operative to change between the first mode and the second mode.

9. A voltage regulator comprising
a power source block configured to convert an input voltage to an output voltage to supply current to an output load;
a storage capacitor;
an active filter configured to bi-directionally transfer energy between the output load and the storage capacitor;
wherein a conversion ratio of the active filter is controlled based on the output voltage; and
wherein a conversion ratio of the power source block is at least partially controlled by a parameter related to a voltage on the storage capacitor;
wherein the power source block comprises:
a series switch element;
a shunt switch element;
a switching controller, the switching controller operative to control opening and closing of the series switch element and the shunt switch element, wherein the opening and closing of the series switch element and the shunt switch element generates a switching voltage, and wherein filtering the switching voltage with an output inductor and a load capacitor generates the output voltage;
wherein control of the conversion ratio of the power source block comprises control of the duty cycle of the opening and closing of the series switch element and the shunt switch element, and wherein the duty cycle is controlled by the parameter related to the voltage on the storage capacitor; and wherein the power source block comprises a current sensor, the current sensor operative to sense an output current of the power source block, wherein control of the conversion ratio is implemented by injecting a voltage proportional to the sensed output current into an error amplifier of the power source block, and wherein the injected voltage divided by the sensed output current is substantially equal to a response time of the power source block divided by a product of the conversion ratio of the active filter and twice a capacitance of the storage capacitor, wherein the response time is time required from a moment a load current of the output load change occurs to a time an inductor current of the output inductor becomes substantially equal to the load current.

10. A method of voltage regulation comprising:
converting, by a power source block, an input voltage to an output voltage to supply current to an output load,
bi-directionally transferring, by an active filter, energy between the output load and a storage capacitor;
controlling a conversion ratio of the active filter based on the output voltage;
at least partially controlling a conversion ratio of the power source block with a parameter related to a voltage on the storage capacitor; and
wherein when a load transient is encountered, the storage capacitor voltage falls to a reduced level, and remains at the reduced level until an end of the load transient.

11. The method of claim 10, further comprising:
controlling opening and closing of a series switch element and a shunt switch element of the power source block, wherein the opening and closing of the series switch element and the shunt switch element generates a switching voltage, and wherein filtering the switching voltage with an output inductor and a load capacitor generates the output voltage; and
at least partially controlling a duty cycle of the opening and closing of the series switch element and the shunt switch element by the voltage on the storage capacitor.

12. The method of claim 11, further comprising:
sensing an output current, with a current sensor, of the power source block,
controlling the duty cycle with a signal proportional to the sensed output current combined with a signal that is proportional to the voltage on the storage capacitor.

13. The method of claim 12, wherein the switching controller comprises a power source compensation network that includes an error amplifier; and further comprising injecting a signal from the current source directly to an input of the error amplifier.

14. The method of claim 10, further comprising:
sensing an output current, with a current sensor, of the power source block, wherein the conversion ratio of the power source block is additionally controlled by a value of the sensed output current.

15. A method of voltage regulation comprising:
converting, by a power source block, an input voltage to an output voltage to supply current to an output load,
bi-directionally transferring, by an active filter, energy between the output load and a storage capacitor;
controlling a conversion ratio of the active filter based on the output voltage;

at least partially controlling a conversion ratio of the power source block with a parameter related to a voltage on the storage capacitor;
controlling opening and closing of a series switch element and a shunt switch element of the power source block, wherein the opening and closing of the series switch element and the shunt switch element generates a switching voltage, and wherein filtering the switching voltage with an output inductor and a load capacitor generates the output voltage;
at least partially controlling a duty cycle of the opening and closing of the series switch element and the shunt switch element by the voltage on the storage capacitor;
wherein the power source block comprises a plurality of phases of switched converters, wherein a phase of each switched converter is offset in time to minimize a variation in a sum of output currents of the plurality of phases of switched converters.

16. The method of claim 15, further comprising:
sensing, by a current sensor, an average output current over all phases of the plurality of phases of switched converters of the power source block, wherein the conversion ratio of the power source block is additionally controlled by a value of the sensed averaged output current.

17. A method of voltage regulation comprising:
converting, by a power source block, an input voltage to an output voltage to supply current to an output load,
bi-directionally transferring, by an active filter, energy between the output load and a storage capacitor;
controlling a conversion ratio of the active filter based on the output voltage;
at least partially controlling a conversion ratio of the power source block with a parameter related to a voltage on the storage capacitor;
wherein the conversion ratio of the power source block is at least partially controlled by the parameter related to the voltage on the storage capacitor during a first mode of the voltage regulator, and the conversion ratio of the power source block is not controlled by the parameter related to the voltage on the storage capacitor during a second mode of the voltage regulator, and the voltage regulator is operative to change between the first mode and the second mode.

18. A method of voltage regulation comprising:
converting, by a power source block, an input voltage to an output voltage to supply current to an output load,
bi-directionally transferring, by an active filter, energy between the output load and a storage capacitor;
controlling a conversion ratio of the active filter based on the output voltage;
at least partially controlling a conversion ratio of the power source block with a parameter related to a voltage on the storage capacitor;
controlling opening and closing of a series switch element and a shunt switch element of the power source block, wherein the opening and closing of the series switch element and the shunt switch element generates a switching voltage, and wherein filtering the switching voltage with an output inductor and a load capacitor generates the output voltage;
at least partially controlling a duty cycle of the opening and closing of the series switch element and the shunt switch element by the voltage on the storage capacitor;
wherein the power source block comprises a current sensor, and further comprising sensing, by a current sensor, an output current of the power source block, wherein control of the conversion ratio is implemented by injecting a voltage proportional to the sensed output current into an error amplifier of the power source block, and wherein the injected voltage divided by the sensed output current is substantially equal to a response time of the power source block divided by a product of the conversion ratio of the active filter and twice a capacitance of the storage capacitor, wherein the response time is time required from a moment a load current of the output load change occurs to a time an inductor current of the output inductor becomes substantially equal to the load current.

\* \* \* \* \*